United States Patent
Özden et al.

(10) Patent No.: US 11,891,853 B2
(45) Date of Patent: Feb. 6, 2024

(54) FRAME SOLUTION WITH GASKET ABUTTING VIG UNIT SURFACE

(71) Applicant: VKR HOLDING A/S, Hørsholm (DK)

(72) Inventors: Utku Ahmet Özden, Hørsholm (DK); Jacob Christian Molbo, Hørsholm (DK); Jens Troels Plesner Kristensen, Hørsholm (DK)

(73) Assignee: VKR HOLDING A/S, Horsholm (DK)

( * ) Notice: Subject to any disclaimer, the term of this patent is extended or adjusted under 35 U.S.C. 154(b) by 93 days.

(21) Appl. No.: 17/422,561

(22) PCT Filed: Jan. 13, 2020

(86) PCT No.: PCT/DK2020/050017
§ 371 (c)(1),
(2) Date: Jul. 13, 2021

(87) PCT Pub. No.: WO2020/147908
PCT Pub. Date: Jul. 23, 2020

(65) Prior Publication Data
US 2022/0090437 A1    Mar. 24, 2022

(30) Foreign Application Priority Data

Jan. 14, 2019 (DK) .............................. PA201970020
Jan. 14, 2019 (DK) .............................. PA201970021
(Continued)

(51) Int. Cl.
*E06B 3/66* (2006.01)
*E06B 3/54* (2006.01)
(Continued)

(52) U.S. Cl.
CPC ............ *E06B 3/6612* (2013.01); *E04D 13/03* (2013.01); *E04D 13/031* (2013.01);
(Continued)

(58) Field of Classification Search
CPC . E06B 3/62; E06B 3/14; E06B 3/6612; E06B 3/6621; E06B 7/2301;
(Continued)

(56) References Cited

U.S. PATENT DOCUMENTS

| 2,595,927 A | 5/1952 | Chapin |
| 2,781,561 A | 2/1957 | Gifford |

(Continued)

FOREIGN PATENT DOCUMENTS

| CN | 2835403 Y | 11/2006 |
| CN | 106760122 A | 5/2017 |

(Continued)

OTHER PUBLICATIONS

International Search Report for corresponding application PCT/DK2020/050008 filed Jan. 13, 2020; dated Apr. 3, 2020.

(Continued)

*Primary Examiner* — Andrew J Triggs
(74) *Attorney, Agent, or Firm* — CANTOR COLBURN LLP

(57) ABSTRACT

The present disclosure relates to an aperture cover (1) such as a window. The aperture cover comprises a vacuum insulated glass unit (3) and a frame (2). The frame (2) comprises a fixation frame (7) and a sash (6) fixed to the vacuum insulated glass unit (3), and wherein the sash (6) is movably connected to the fixation frame (7) by means of a hinge connection (80). The fixation frame (7) comprises elongated frame members (8a-8d) defining a frame opening (2a) and the vacuum insulated unit (3) overlaps a surface (11) of at least one elongated frame member (8a-8d) of the fixation frame (7). The sash (6) comprises a sash profile (13) which is fixed to the vacuum insulated glass unit (3) at a part (21, 22) of the vacuum insulated glass unit that overlaps (21) and/or extends beyond (22) the overlapped elongated frame (Continued)

Figure 1:
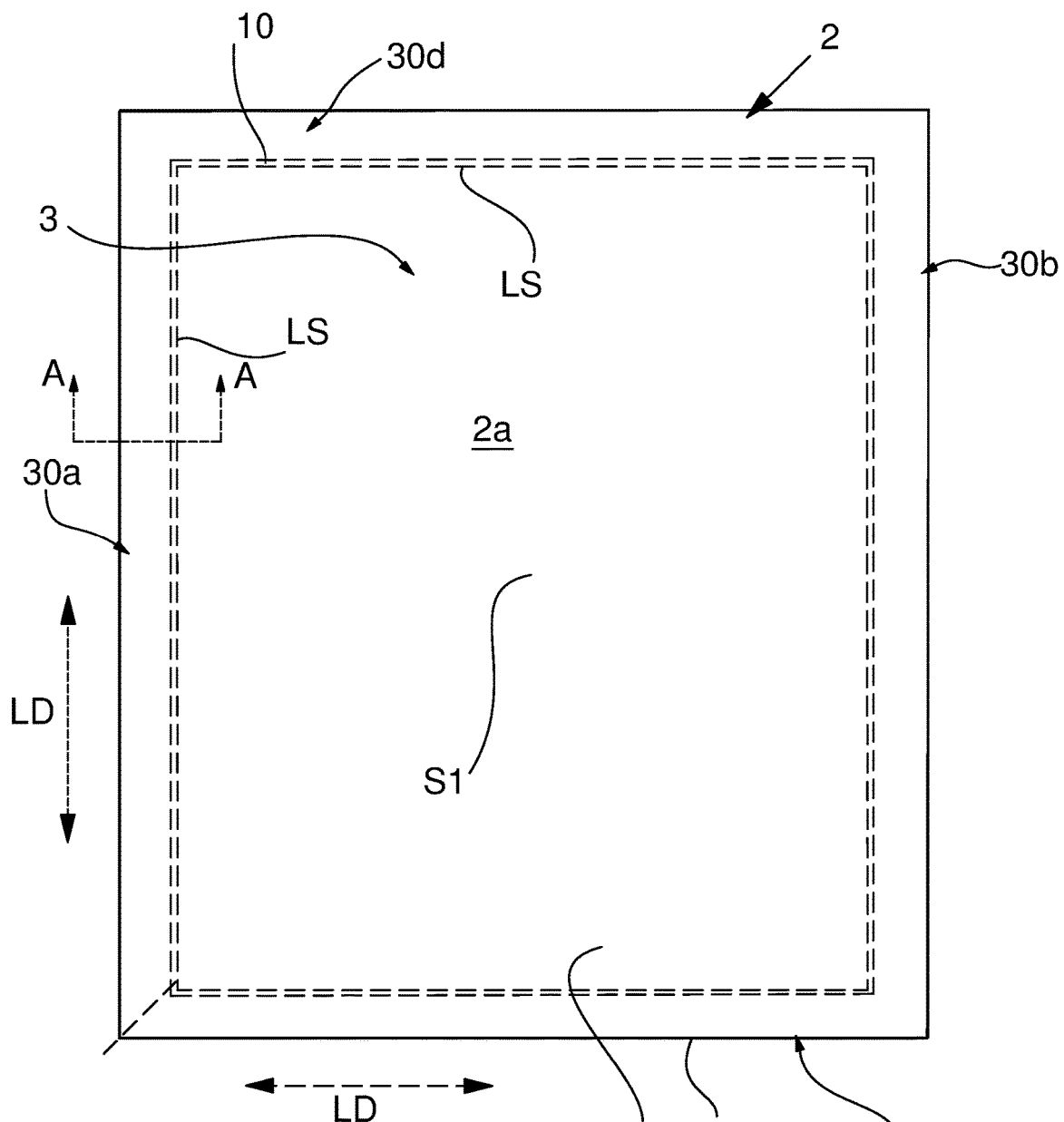

member (8a-8d). A resilient sealing gasket (10) is arranged between the overlapped elongated frame member (8a-8d) and the vacuum insulated glass unit, and the resilient sealing gasket (10) is configured to abut the interior major surface (S2) of the vacuum insulated glass unit when the sash (6) is in a closed position. The interior major surface (S2) of the vacuum insulated glass unit is configured to compress the resilient sealing gasket (10) when moving the sash (6) from an open to a closed position.

19 Claims, 11 Drawing Sheets

(30) Foreign Application Priority Data

| Jan. 14, 2019 | (DK) | PA201970022 |
|---|---|---|
| Jan. 14, 2019 | (DK) | PA201970023 |
| Jan. 14, 2019 | (DK) | PA201970024 |
| Jan. 14, 2019 | (DK) | PA201970025 |
| Jan. 14, 2019 | (DK) | PA201970026 |

(51) Int. Cl.

| *E06B 3/62* | (2006.01) |
|---|---|
| *E04D 13/035* | (2006.01) |
| *E06B 3/02* | (2006.01) |
| *E06B 3/56* | (2006.01) |
| *E06B 3/677* | (2006.01) |
| *E06B 7/23* | (2006.01) |
| *E04D 13/03* | (2006.01) |
| *E06B 3/14* | (2006.01) |

(52) U.S. Cl.
CPC ....... *E04D 13/035* (2013.01); *E04D 13/0315* (2013.01); *E04D 13/0351* (2013.01); *E04D 13/0354* (2013.01); *E06B 3/025* (2013.01); *E06B 3/14* (2013.01); *E06B 3/5427* (2013.01); *E06B 3/5454* (2013.01); *E06B 3/5481* (2013.01); *E06B 3/56* (2013.01); *E06B 3/62* (2013.01); *E06B 3/6621* (2013.01); *E06B 3/677* (2013.01); *E06B 7/2301* (2013.01); *E06B 7/2305* (2013.01); *E06B 2003/6208* (2013.01); *E06B 2003/6229* (2013.01); *E06B 2003/6238* (2013.01); *E06B 2003/6291* (2013.01); *Y02A 30/249* (2018.01); *Y02B 80/22* (2013.01)

(58) Field of Classification Search
CPC ...... E06B 3/5454; E06B 3/025; E06B 3/5427; E06B 3/5481; E06B 3/56; E06B 3/677; E06B 7/2305; E06B 2003/6208; E06B 2003/6238; E06B 2003/6291; E06B 2003/6229; E04D 13/0315; E04D 13/0354; E04D 13/0351; E04D 13/035; E04D 13/03; E04D 13/031; Y02B 80/22; Y02A 30/249

See application file for complete search history.

(56) References Cited

U.S. PATENT DOCUMENTS

| 3,686,795 | A |  | 8/1972 | La Barge | |
|---|---|---|---|---|---|
| 3,861,085 | A |  | 1/1975 | Jacob | |
| 4,134,234 | A |  | 1/1979 | Auger | |
| 4,134,238 | A |  | 1/1979 | Auger | |
| 4,862,657 | A | * | 9/1989 | Jentoft | E04D 13/0354 |
|  |  |  |  |  | 52/309.1 |
| 5,216,855 | A | * | 6/1993 | Richter | E06B 3/5821 |
|  |  |  |  |  | 52/204.593 |
| 5,373,672 | A |  | 12/1994 | Schulz | |
| 6,263,623 | B1 |  | 7/2001 | Weiss | |
| 6,295,774 | B1 | * | 10/2001 | Lindgren | E04D 13/031 |
|  |  |  |  |  | 52/204.1 |
| 6,435,360 | B1 |  | 8/2002 | Anin | |
| 8,283,023 | B2 | * | 10/2012 | Mott | E06B 3/66342 |
|  |  |  |  |  | 428/184 |
| 9,447,627 | B2 |  | 9/2016 | Thompson | |
| 2007/0032972 | A1 |  | 2/2007 | Glover | |
| 2009/0324858 | A1 |  | 12/2009 | Jaeger | |
| 2012/0137607 | A1 |  | 6/2012 | Kristensen | |
| 2013/0101759 | A1 |  | 4/2013 | Jones | |
| 2014/0007396 | A1 |  | 1/2014 | Jones | |
| 2014/0069034 | A1 |  | 3/2014 | Jones | |
| 2015/0345207 | A1 |  | 12/2015 | Thompson | |
| 2017/0002599 | A1 |  | 1/2017 | Thompson | |
| 2022/0090437 | A1 | * | 3/2022 | Özden | E06B 3/14 |

FOREIGN PATENT DOCUMENTS

| DE | 3202639 | A1 |  | 8/1983 | |
|---|---|---|---|---|---|
| DE | 102006020455 | A1 |  | 6/2007 | |
| DE | 202009016113 | U1 |  | 5/2011 | |
| DE | 10201400186 | A1 |  | 2/2016 | |
| EP | 0418461 | A1 |  | 3/1991 | |
| EP | 0421239 | A2 |  | 4/1991 | |
| EP | 0472109 | A2 |  | 2/1992 | |
| EP | 1298100 | A1 |  | 4/2003 | |
| EP | 1908914 | A1 |  | 4/2008 | |
| EP | 2169172 | A2 |  | 3/2010 | |
| EP | 2921632 | A1 |  | 9/2015 | |
| EP | 3101195 | A1 | * | 12/2016 | |
| EP | 3101195 | A1 |  | 12/2016 | |
| EP | 3124733 | A1 |  | 2/2017 | |
| EP | 3170799 | A1 |  | 5/2017 | |
| FR | 2514057 | A1 |  | 4/1983 | |
| FR | 2823789 | A1 |  | 10/2002 | |
| FR | 2942843 | A1 |  | 9/2010 | |
| GB | 2492380 | A |  | 1/2013 | |
| GB | 2492380 | A | * | 1/2013 | E04D 13/03 |
| GB | 2521419 | A |  | 6/2015 | |
| JP | 2000064732 | A |  | 2/2000 | |
| JP | 2001146881 | A |  | 5/2001 | |
| JP | 2002021437 | A |  | 1/2002 | |
| JP | 2007132637 | A |  | 5/2007 | |
| KR | 20180128659 | A |  | 12/2018 | |
| WO | 2014039642 | A1 |  | 3/2014 | |
| WO | 2014183606 | A1 |  | 11/2014 | |
| WO | 2015183863 | A1 |  | 12/2015 | |
| WO | 2017210701 | A1 |  | 12/2017 | |

OTHER PUBLICATIONS

International Search Report for corresponding application PCT/DK2020/050009 filed Jan. 13, 2020; dated Mar. 30, 2020.
International Search Report for corresponding application PCT/DK2020/050010 filed Jan. 13, 2020; dated Mar. 25, 2020.
International Search Report for corresponding application PCT/DK2020/050011 filed Jan. 13, 2020; dated Apr. 7, 2020.
International Search Report for corresponding application PCT/DK2020/050012 filed Jan. 13, 2020; dated Apr. 9, 2020.
International Search Report for corresponding application PCT/DK2020/050013 filed Jan. 13, 2020; dated Mar. 19, 2020.
International Search Report for corresponding application PCT/DK2020/050014 filed Jan. 13, 2020; dated Apr. 14, 2020.
International Search Report for corresponding application PCT/DK2020/050015 filed Jan. 13, 2020; dated Mar. 27, 2020.
International Search Report for corresponding application PCT/DK2020/050016 filed Jan. 13, 2020; dated Apr. 1, 2020.
International Search Report for corresponding application PCT/DK2020/050017 filed Jan. 13, 2020; dated Feb. 18, 2020.
International Search Report for corresponding application PCT/DK2020/050018 filed Jan. 13, 2020; dated Feb. 18, 2020.
Written Opinion for corresponding application PCT/DK2020/050008 filed Jan. 13, 2020; dated Apr. 3, 2020.

(56) References Cited

OTHER PUBLICATIONS

Written Opinion for corresponding application PCT/DK2020/050009 filed Jan. 13, 2020; dated Mar. 30, 2020.
Written Opinion for corresponding application PCT/DK2020/050010 filed Jan. 13, 2020; dated Mar. 25, 2020.
Written Opinion for corresponding application PCT/DK2020/050011 filed Jan. 13, 2020; dated Apr. 7, 2020.
Written Opinion for corresponding application PCT/DK2020/050012 filed Jan. 13, 2020; dated Apr. 9, 2020.
Written Opinion for corresponding application PCT/DK2020/050013 filed Jan. 13, 2020; dated Mar. 19, 2020.
Written Opinion for corresponding application PCT/DK2020/050014 filed Jan. 13, 2020; dated Apr. 14, 2020.
Written Opinion for corresponding application PCT/DK2020/050015 filed Jan. 13, 2020; dated Mar. 27, 2020.
Written Opinion for corresponding application PCT/DK2020/050016 filed Jan. 13, 2020; dated Apr. 1, 2020.
Written Opinion for corresponding application PCT/DK2020/050017 filed Jan. 13, 2020; dated Feb. 18, 2020.
Written Opinion for corresponding application PCT/DK2020/050018 filed Jan. 13, 2020; dated Feb. 18, 2020.

* cited by examiner

FRAME SOLUTION WITH GASKET ABUTTING VIG UNIT SURFACE

The present disclosure relates to an aperture cover such as a window, where the aperture cover comprises a vacuum insulated glass unit and a frame.

BACKGROUND

Vacuum insulated glass (VIG) units provides several advantages such as good heat insulation properties and reduced thickness. A VIG unit may typically comprise glass sheets kept separated by support structures arranged in an airtight and evacuated gap between the glass sheets. To provide an airtight gap, an edge sealing is applied along the glass sheet edges so as to enclose the gap between the glass sheets. This edge seal may be made from e.g. a glass frit material such as low melting point glass frit material which is applied along the edges of a glass sheet and then subsequently heated in order to melt the glass material to provide an airtight and strong edge sealing.

Patent document U.S. Pat. No. 9,447,627B2 discloses a window frame unit for a vacuum insulated glass unit. A base member and a glazing member of a frame provides a recess wherein a distal edge of a VIG unit is arranged. The recess is disclosed to be designed to accommodate distortion of the VIG unit rather than constraining the VIG unit at the distal edge of the VIG unit. This is obtained by a resilient, flexible tab of a glazing member that is/are snapped into engagement with a base member of the frame, so that the tabs may allow the glazing member to pivot to accommodate distortion of the VIG unit.

U.S. Pat. No. 6,435,630 B1 and JP2007132637 discloses other solutions for holding a VIG unit. Patent document EP2169172 B1 discloses a further solution where a frame holds a VIG unit by means of an adhesive at a surface facing a sash. US2012137607 discloses a window frame and a possible VIG where the pane is moulded in an element.

It however appears that problems still exists when arranging a VIG unit in a frame to provide for example a window or door for e.g. covering building apertures.

The present disclosure provides one or more solutions where a VIG unit is arranged in a frame, which may e.g. help to improve or ensure the lifetime, such as the estimated lifetime, of the VIG unit. It may also or alternatively provide a more simple mechanical solution for holding a VIG unit in/at a frame, provide a solution that may be used under varying climatic conditions, and/or provide a solution which is advantageous from a manufacturing point of view and which may enable a space saving solution.

SUMMARY

VIG units are normally made from glass sheets kept separated by support structures such as pillars arranged in an airtight and evacuated gap between the glass sheets. To provide the airtight gap, an edge sealing is provided along the glass sheet edges so as to enclose the gap between the glass sheets. This edge seal may be made from e.g. a glass frit material such as low melting point glass frit material which is applied along the edges of a glass sheet and then subsequently heated in order to melt the glass material to provide an airtight and strong edge sealing. The edge seal may alternatively be made from a metal seal which is heated to a melting point and then cooled to cure.

The gap(s) between the glass sheets are normally evacuated by means of an evacuation cup connected to an evacuation pump, and the evacuation cup is arranged to cover an evacuation hole in one of the glass sheets for the VIG unit, which is then sealed after the evacuation of the gap. Alternatively, the gap may be evacuated in an evacuation chamber enclosing the entire VIG unit. The gap is normally evacuated to below $10^{-3}$ bar, such as below $10^{-4}$ bar, e.g. to about or below $10^{-3}$ mbar.

The VIG unit is subjected to significant temperature differences $\Delta T$ between the VIG unit glass sheets due to the good insulation capabilities of the VIG unit. As the edge seal for sealing the gap between the VIG unit glass sheets is normally very stiff in nature, the temperature difference $\Delta T$ between the glass sheets causes the VIG unit to deflect (also known as thermal bending, thermal deflection or thermal distortion), as the hotter glass sheet of the VIG unit will expand compared to the colder of the glass sheets.

VIG units according to aspects of the present disclosure may in aspects of the present disclosure provide a $U_g$-value at or below 0.7 W/(m$^2$K), such as at or below 0.6 W/(m$^2$K), e.g. at or below 0.5 W/(m$^2$K) such as below 0.4 W/(m$^2$K), and such VIG units may suffer from increased thermal deflection due to the good insulation provided by means of the VIG unit. This low $U_g$-value may be obtained by means of the evacuation of the gap between the VIG glass sheets, e.g. in combination with one or more one or more of

- One or more low-e coatings such as thin tin dioxide or thin silver layers or any other suitable low e-coating layers at e.g. the inner surface(s) of the glass sheets of the VIG unit facing the VIG unit gap,
- a larger/increased support structure distance, such as above 3 or above 4 centimetres, for example above 5 centimetres, between neighbouring support structures in the VIG unit gap to reduce the number of potential "cold-bridges" provided by the support structures,
- by using support structures of a material having a low thermal conductivity and/or a small size,
- By providing a 3-layer VIG unit (i.e. with two evacuated gaps placed between a middle glass sheet and a glass sheets arranged at and parallel to opposite surfaces of the middle glass sheet),
- By providing a "floating" glass pane inside an evacuated gap, and with support structures placed at each side of the "floating" glass pane and the outer VIG unit glass sheets. (by "floating" is understood that the glass pane is not fixed to/by edge sealing material, instead the edge of the floating glass pane is placed with a gap between the edge and the edge seal part that encloses the evacuated gap between the outer two VIG glass sheets)
- By providing a hybrid VIG unit comprising a first evacuated gap between first and second glass sheets and a second gas filled gap between the second glass sheet and a further glass sheet.

It is understood that the support structures may generally be arranged in a repeated pattern such as a grid with parallel rows and columns having substantially the same distance between neighbouring support structures. In other aspects of the present disclosure, the support structures may be arranged in a pattern that has been determined/adapted based on a predetermined stress profile. This stress profile may e.g. be established by means of tests and/or computer simulations of a VIG unit. In this case, the distance between neighbouring support structures may be different at certain areas of the VIG unit across the VIG unit. For example so that there is a larger distance between some neighbouring support structures where the stress conditions are lower, and possibly a higher number of support structures where the stress conditions may be, or potentially become, higher.

The present disclosure relates to an aperture cover such as a window, for example a roof window, or a door. The aperture cover comprises vacuum insulated glass unit comprising a first glass sheet and a second glass sheet, wherein an evacuated gap is placed between the first and second glass sheets. A plurality of support structures are distributed in the evacuated gap, and an edge seal encloses the evacuated gap. The vacuum insulated glass unit comprises outer major surfaces. The aperture cover moreover comprises a frame, wherein the frame comprises a fixation frame and a sash which is fixed to the vacuum insulated glass unit. The sash is movably connected to the fixation frame by means of a hinge connection. The fixation frame comprises elongated frame members defining a frame opening, and the vacuum insulated unit is configured to overlap a surface of at least one elongated frame member of the fixation frame, at least when the sash is in a closed position. The sash comprises a sash profile which is fixed to the vacuum insulated glass unit at a part of the vacuum insulated glass unit that overlaps and/or extends beyond the overlapped elongated frame member. A resilient sealing gasket is arranged between the overlapped elongated frame member and the vacuum insulated glass unit, and the resilient sealing gasket is configured to abut the interior major surface of the vacuum insulated glass unit when the sash is in a closed position. The interior major surface of the vacuum insulated glass unit is configured to compress/deflect the resilient sealing gasket when moving the sash from an open to a closed position.

The present disclosure facilitates providing a space saving frame solution for a VIG unit which has good insulating capabilities and at the same time provides desirable aesthetic advantages.

Cold bridges may be caused by the edge sealing of the VIG unit, such as a rigid "fused" edge sealing such as a solder glass or metal solder edge sealing. Such edge sealings provides strong and wear resistant bonding capabilities for sealing the evacuated gap, but comes with the disadvantage of being a good conductor of heat, which may cause issues at and near the edges of the VIG unit. As the VIG unit overlaps elongated frame profile(s) of the fixed/fixation frame, this helps to reduce or even substantially avoid cold bridges which transfer cold to the visible part of the VIG unit when the sash is in a closed position, and hence condensation at the visible part of the interior surface of the VIG unit when the sash is closed may be reduced or substantially fully avoided.

The sealing gasket additionally helps to improve air insulating capabilities and helps to handle/prevent condensation at the interior surface of the VIG unit facing the fixation frame when the sash is closed.

Moreover, the present disclosure may enable providing a solution where, when viewing the window from the exterior of the window, the viewer is given the impression of a more narrow frame/sash solution or even a substantially frameless solution.

When the sash is moved towards an open position, the gasket expands to an un-deflected/un-compressed state, and is then compressed/deflected again when the sash is moved towards the closed position.

It is generally understood that in one or more aspects of the present disclosure, the VIG unit may overlap the elongated frame member so that the evacuated gap of the VIG unit also overlaps the overlapped elongated frame member.

In one or more aspects of the present disclosure, the sealing gasket is configured to be compressed by at least 2 mm, such as at least 4 mm, for example by at least 6 mm by the interior major surface of the vacuum insulated glass unit when compared to the sealing gasket height in an uncompressed condition, when the temperature difference between the glass sheets of the vacuum insulated glass unit is substantially 0° C.

This may enable a sufficient tightening by means of the gasket, also in case of a thermal deflection of the VIG unit. The thermal deflection of the VIG unit may cause a bending/deflection curve of the edge of the VIG unit along the edge of the VIG unit and hence cause varying deflection along the VIG unit edge. By providing a compression of the gasket according to the above, this may enable a gasket that can also assure tightness in cases of thermal deflection of the VIG unit.

In one or more aspects of the present disclosure, the sealing gasket (10) may be configured to be compressed (Hc) by between 2 mm and 15 mm, such as between 3 mm and 9 mm, for example between 4 mm and 8 mm by the interior major surface of the vacuum insulated glass unit when compared to the sealing gasket height in an uncompressed condition.

The height of the resilient sealing gasket may in one or more aspects of the present disclosure be configured to be at least 5 mm, such as at least 6 mm or at least 7 mm in an uncompressed/un-deflected condition.

This enables that a more tight aperture covering solution may be obtained also in case of a larger thermal deflection of the VIG unit near/in the area of the VIG unit where the resilient sealing gasket is placed.

In one or more aspects of the present disclosure, the height of the resilient sealing gasket may be configured to be between 5 mm and 25 mm, such as between 5 mm and 15 mm or between 7 mm and 14 mm in an uncompressed/un-deflected condition.

In one or more aspects of the present disclosure, the magnitude (Hc) of the compression of the sealing gasket by the vacuum insulated glass unit may be configured to vary across the length of the sealing gasket when the temperature difference between the two glass sheets of the vacuum insulated glass unit enclosing the evacuated gap is 40° C. or 65° C.

The present inventors have as mentioned above discovered that the edge of the VIG unit tends to describe a bending curve/arc along the length of the edge. This bending curve may provide a need for enhanced gasket solution in order to accommodate varying edge deflection along the length of the VIG unit edge in order to provide a sufficient tightening also under more extreme temperature differences between the interior and exterior major surfaces of the VIG unit. Providing a solution where the compression of the sealing gasket by the vacuum insulated glass unit surface is configured to vary across the length of the sealing gasket when the temperature difference between the two glass sheets of the vacuum insulated glass unit enclosing the evacuated gap is 40° C. or 65° C. help to assure a sufficient air tightening over time during varying temperature differences, and may hence help to provide an aperture cover with increased heat insulation properties and/or reduced risk of condensation at the interior surface of the VIG unit at the part of the VIG unit that is made visible in the frame opening.

In one or more aspects of the present disclosure, the sealing gasket is placed with a distance of at least 25 mm such as at least at least 35 mm, for example at least 50 mm or 60 mm, from the edge of the vacuum insulated glass unit when the sash is in a closed position.

This may help to reduce cold bridges through the edge seal to the part of the VIG unit that is visible through the frame opening, and generally help to provide an aperture cover with enhanced heat insulation performance in a space saving way. The said distance is measured from the edge of the vacuum insulated glass unit and to the side surface of the gasket that is proximate the vacuum insulated glass unit's edge, and where the distance is measured substantially parallel to a major outer surface of the vacuum insulated glass unit in a direction perpendicular to the longitudinal direction of the edge of the VIG.

In one or more aspects of the present disclosure, the resilient sealing gasket may be positioned between a part of the sash and the frame opening when the sash is in a closed position, in a space provided between the overlapped elongated frame member of the fixation frame and the interior major surface of the vacuum insulated glass unit. This may e.g. help to provide a mechanically simple and/or space saving solution In one or more aspects of the present disclosure, the sealing gasket may defines a/the line of sight for a view through the frame opening and the vacuum insulated glass unit when the sash is in a closed position.

This may help to provide a desired aesthetic appearance of the aperture cover which is mechanically simple, and also provide a solution where the risk of formation of condensation on the interior major surface of the VIG unit at the area that is visible through the frame opening, is reduced. It may e.g. provide that the sealing gasket is placed further away from the position of the edge seal of the VIG unit.

The sash profile may in one or more aspects of the present disclosure be a metal profile, for example an aluminium profile or steel profile.

Metal profiles provides good strength and long lasting solutions, and may also provide advantages with regard to fixation the VIG unit to the sash. Though, metal profiles suffer from having a high thermal conductivity which may however be of less concern due to the solution(s) according to the present disclosure.

In one or more aspects of the present disclosure, the vacuum insulated glass unit may be fixed to the elongated sash profile by means of a bonding seal attached to the interior major surface and/or the exterior major surface of the vacuum insulated glass unit.

This may e.g. provide a mechanically simple solution in order to assure a sufficiently strong and long lasting solution. In this solution, a metal sash profile may be advantageous in order to assure a good and long lasting fixation of the VIG unit to the sash profile. The structural adhesive is preferably resilient and can thus be compressed and stretched when/if the VIG unit thermally deflects.

In one or more aspects of the present disclosure, the bonding seal may comprise a structural adhesive such as a silicon adhesive, a silane-terminated polyurethane (SPUR) adhesive or a Modified-Silyl Polymer (SMP) adhesive.

Such structural adhesive may provide a strong and yet long lasting solution for the bonding seal.

The bonding seal may in one or more aspects of the present disclosure be attached to the interior major surface of the vacuum insulated glass unit. This may e.g. help to provide a solution where the attachment of the VIG to the sash may be more protected and/or enable a solution where a larger part of the exterior VIG unit surface may be exposed. In one or more aspects of the present disclosure, the exterior major surface of the vacuum insulated glass unit may here hence be e.g. substantially uncovered by the sash. Alternatively, the sash may cover a part of the exterior of the VIG unit and may here in still further aspects of the present disclosure be attached to the exterior major surface of the VIG unit by e.g. a bonding seal. Here the bonding seal at the interior surface may be omitted or the sash may be attached to the VIG unit at both the exterior and interior surfaces of the VIG unit.

In one or more aspects of the present disclosure, the of the bonding seal is about or above 5 mm or above 6 mm at a temperature difference between the two glass sheets (3a, 3b) of the vacuum insulated glass unit of substantially 0° C.

In one or more aspects of the present disclosure, said bonding seal has a thickness between 4 mm and 13 mm, such as between 4 mm and 10 mm, for example between 5 mm and 10 mm, at a temperature difference between the two glass sheets (3a, 3b) of the vacuum insulated glass unit of substantially 0° C.

Said thickness is measured in a direction perpendicular to an outer major surface of the vacuum insulated glass unit. This may help to provide a frame solution that can cope thermal deflections of a VIG unit at the edge areas of the VIG unit, as the bonding seal may hence be compressed and/or stretched sufficiently when the magnitude of the thermal deflection of the VIG unit changes over time. The VIG unit edge may hence e.g. be able to provide a deflection curve, and hence partly stretch and partly compress the bonding seal along the longitudinal direction of the connection profile.

In one or more aspects of the present disclosure, the bonding seal may be placed opposite to and thus overlap the edge seal of the VIG unit.

In one or more aspects of the present disclosure, the bonding seal is terminated at the outer major surface of the VIG unit so that the edge surface of the vacuum insulated glass unit is un-bonded to the bonding seal material.

This may e.g. provide a more wear resistant solution as the bonding seal material may be subjected to forces in fewer directions.

In one or more aspects of the present disclosure, aperture cover is a window such as a roof window. Here, the overlapped elongated frame member may comprise an outer frame surface facing away from the frame opening, and the sash, such as the sash profile may comprise a skirt wall configured to extend over and cover a part of the outer frame surface, at least when the sash is in a closed position.

This provides a simple and yet mechanically simple solution for providing good water tightness of the window. Especially water tightening of roof windows requires reliable and good water tightness. Providing that the sash profile also comprises the skirt wall, such as a skirt wall integrated therein (e.g. as part of an extrusion, pultrusion or roller forming manufacturing process), or a skirt wall connected to the sash profile, may provide a mechanically simple, space saving and water resistant solution.

In one or more aspects of the present disclosure, the shield wall is a weather shield configured to interface with a flashing part.

The shield wall may thereby deliver rainwater and/or meltwater into a water guidance channel or onto another water guidance surface, which may e.g. be formed by a flashing profile by a roof structure and/or the like.

It is generally understood that in one or more aspects of the present disclosure, the aperture cover may be a window such as a roof window, for example a top-hung roof window.

In one or more aspects of the present disclosure, the sash, such as the sash profile may comprises a protection wall extending opposite to the edge surface of the vacuum insulated glass unit. For example, in further aspects a resilient sealing may be placed between the protection wall and the edge surface of the vacuum insulated glass unit.

The protection wall helps to provide an improved mechanical protection of the edge(s) of the VIG unit. The optional resilient sealing placed between the protection wall and the edge surface of the vacuum insulated glass unit provides improved water tightness and may reduce the risk of frost damages due to water entering in between protection wall and the VIG unit edge surface. Additionally, if the exterior surface is exposed all the way to the edge of the VIG unit, which it may be in aspects of the present disclosure, the resilient edge sealing between the protection wall and the VIG unit edge surface may help to provide a desired, aesthetic appearance of the aperture cover.

In one or more aspects of the present disclosure, the protection wall may overlaps the edge surface of one, two or three glass sheets of the vacuum insulated glass unit, or even edge surfaces of even more glass sheets of the VIG unit if present.

In one or more aspects of the present disclosure, the elongated frame members of the fixation frame may comprise a top profile member, a bottom profile member and two parallel side profile members, and wherein the overlapped elongated frame profile is at least the two parallel side profile members and/or the bottom profile member.

In one or more aspects of the present disclosure, the overlapped elongated frame member is an elongated structural member such as a wood profile, a plastic profile, such as PVC or PUR profile, and/or a composite profile comprising carbon fibres and/or glass fibres.

This overlapped structural member helps to provide mechanical rigidity to the frame and helps to carry he sash and thus also the VIG unit.

In one or more aspects of the present disclosure, the edge of the vacuum insulated glass unit extending parallel to and along the overlapped elongated frame member is allowed to deflect in response to a temperature difference ($\Delta T=T1-T2$) between the two glass sheets of the vacuum insulated glass unit. This may at least occur at a temperature difference ($\Delta T=T1-T2$) of 40° C. or 65° C.

The edge may here be allowed to move in the sash due to thermal deflection. This may help to reduce stress conditions at the edge area and/or corner areas of the VIG unit.

The present inventors have found that computer simulations revealed that in certain situations when a VIG unit is arranged in a roof window so that the major outer surfaces are not completely vertical, gravity acts on the VIG unit and may (try to) cause a further deflection of the edges of the VIG unit. This may some situations add on to an already present thermal deflection of the VIG unit edges due to a temperature difference between the VIG units. Hence a "worse case" scenario may be if the hotter surface of the VIG unit is the interior VIG unit glass sheet surface (often a surface of a lamination glass sheet in roof windows), as both gravity and thermal deflection acts in the same deflection direction.

In one or more aspects of the present disclosure, a largest edge deflection in a deflection direction of the edges of the vacuum insulated glass unit at a temperature difference ($\Delta T=T1-T2$) between the two glass sheets of 65° C., as compared to the vacuum insulated glass unit at a temperature difference ($\Delta T=T1-T2$) of 0° C. is at least 1 mm, such as at least 2 mm.

The deflection direction is here determined as perpendicular to a frame opening plane which extends parallel to longitudinal members of the frame enclosing the frame opening. The maximum allowed edge deflection may in aspects be between 1 mm and 30 mm, such as between 1 mm and 20 mm, for example between 1 mm and 10 mm.

In one or more aspects of the present disclosure, one or more of the edges of the vacuum insulated glass unit is/are allowed to provide a deflection curve/arc between the corners where the respective edge terminates, in response to a temperature difference ($\Delta T=T1-T2$) between the two glass sheets of the vacuum insulated glass unit.

The inventors have seen that the edges of the VIG unit describes a deflection curve when the VIG unit is subjected to substantial thermal deflection which may become rather substantial, such as a $\Delta T$ above 40° C. or about or above 65° C. The inventors have seen that it may be advantageous to allow this edge deflection curve, at least to a certain extent, in order to for example reduce stress conditions in the VIG unit.

In one or more aspects of the present disclosure, the outer major surfaces of the vacuum insulated glass unit may have a surface area defined between the edges of the vacuum insulated glass unit, of at least 0.9 m$^2$, such as at least 1.3 m$^2$. Such larger VIG units may be subjected to increased stress conditions that due to thermal deflection that may be needed to be handled, and a frame solution according to the present disclosure may be especially suitable for such larger VIG units.

The VIG surface area may in one or more aspects of the present disclosure e.g. be between 0.9 m$^2$ and 4 m$^2$ such as between 1.3 m$^2$ and 2.5 m$^2$.

In one or more aspects of the present disclosure, the major surfaces of the vacuum insulated glass unit may have a rectangular shape. Rectangular VIG units may provide even more complex stress conditions and/or thermal deflection of the VIG unit, and a frame solution according to the present disclosure is relevant for rectangular VIG units.

In one or more aspects of the present disclosure, the vacuum insulated glass unit is fixed to the elongated sash profiles by means of a clamping fixation system.

This may help to provide an efficient fixation of the VIG unit. The clamping system may in till further aspects provide/enable a clamping force towards the outer major surfaces of the VIG unit when the VIG unit thermally deflects.

In one or more aspects of the present disclosure, the sash profile may be fixed to the vacuum insulated glass unit at a part of the vacuum insulated glass unit that overlaps the overlapped elongated frame member.

This may e.g. help to provide a space saving solution that also provides a good heat insulation performance. In one or more aspects, the vacuum insulated glass unit overlaps the fixation frame by a distance, where said distance is at least 2.5 cm such as at least 3 cm for example at least 4 cm.

This may e.g. help to enable a desired aesthetic appearance of the VIG unit and/or help to provide an aperture cover with good heat insulation performance as the edge seal of the VIG unit is arranged with a good distance from the frame opening.

The VIG unit may in aspects of the present disclosure overlap the fixation frame by between 2.5 cm and 12 cm such as between 3 cm and 10 cm, for example between 4 cm and 8 cm.

In one or more aspects of the present disclosure, a part of the vacuum insulated glass unit overlaps the structural frame member, and moreover extends beyond an outer surface of the fixation frame with a distance, wherein this distance is at least 1 cm such as at least 2 cm, for example at least 4 cm.

This may e.g. help to enable a desired aesthetic appearance of the VIG unit and/or help to provide an aperture cover with even more improved heat insulation performance as the edge seal of the VIG unit is arranged with a larger distance from the frame opening.

In aspects of the present disclosure, the part of the vacuum insulated glass unit extending beyond the outer surface of the fixation frame may extend between 1 cm and 10 cm such as between 1 cm and 8 cm, for example between 2 cm and 6 cm beyond the surface of the fixation frame.

The sum of the distance with which the VIG unit extends beyond the outer surface of the fixation frame and the distance with which the VIG unit overlaps the fixation frame may in aspects of the present disclosure be at least 25 mm, such as at least 35 mm, such as at least 50 mm. The ratio between this summarized distance and the length of the longest edge of the VIG unit may preferably be within 0.015 and 0.07, such as between 0.017 and 0.06, for example between 0.018 and 0.05.

In one or more aspects of the present disclosure, the sash profile is fixed to the vacuum insulated glass unit at a part of the vacuum insulated glass unit that extends beyond an outermost surface of the fixation frame, such as beyond an outermost surface (9a) of the overlapped elongated frame member. This provides a solution with good heat insulation performance, and at the same time it may help provide a space saving frame solution.

In one or more aspects of the present disclosure, the difference between the total width (TWsa) of the sash, and the total width of the fixation frame may be less than ±5%, such as less than ±2%, such as less than ±1% of the total width of the fixation frame. In one ore more further or alternative aspects of the present disclosure, the difference between the total height of the sash, and the total height of the fixation frame may be less than ±5%, such as less than ±2%, such as less than ±1% of the total height of the fixation frame.

This may help to provide a window solution where VIG units may be placed closer together and/or in addition to providing good heat insulation performance, also help to enable a desired visual appearance such as a solution where the exterior surface of the VIG unit may be more exposed, also above the fixation frame.

In one or more aspects of the present disclosure, the difference between the total area of the fixation frame and the total area of the sash, respectively, may be less than ±8% such as less than ±5%, such as or less than ±1% of the total area of the fixation frame, where the total area of the fixation frame is defined by the total width of the fixation frame multiplied with the total height of the fixation frame, an where the total area of the sash is defined by the total width of the sash multiplied with the total height of the sash.

This may help to provide a solution with good heat insulation capabilities and also a solution that may enable that the edge surfaces of the VIG unit may be placed closer together in case two aperture covers are placed side by side. It may also help to provide a solution which enable desired visual appearance.

The difference between total height and/or total width of the VIG unit and total height and/or width of the sash may in aspects of the present disclosure be between 0 and 5 cm such as between 0 and 3 cm, for example between 0 and 1 cm or between 0 and 0.5 cm.

It is generally understood that a part of the sash profile, such as a protection wall or a water skirt of the sash profile, in one or more aspects of the present disclosure may define the outermost part(s) and hence the total width/height of the sash. Here, the total height and/or width of the sash may for example be measured between the outermost parts of two parallel elongated frame arrangements arranged along opposing parallel edge surfaces of the VIG unit such as side edges or top and bottom edges.

In aspects of the present disclosure, the difference between the total width of the VIG unit, and the total width of the fixation frame may be less than ±8%, such as less than ±5% of the total width of the VIG unit. In certain embodiments of the present disclosure, the difference between the total width of the VIG unit, and the total width of the fixation frame may be less than ±2% or less than ±1% of the total width of the VIG unit. The same may apply for the total height of the frame and the total height of the VIG unit respectively.

In aspects of the present disclosure, the total width of the sash, and the total width of the fixation frame and/or the width of the VIG unit, may be substantially the same. Also or alternatively, in aspects of the present disclosure, the total height of the sash, the total height of the fixation frame, and/or the total height of the VIG unit may be substantially the same.

In one or more aspects of the present disclosure, the sash may be configured to partly restrict a thermal deflection of the vacuum insulated glass unit in response to a temperature difference ($\Delta T = T1 - T2$) between the glass sheets of the vacuum insulated glass unit, when compared to a free, unrestricted thermal deflection of the vacuum insulated glass unit at substantially the same temperature difference. This may e.g. help to allow providing a more space saving frame solution as the frame does not need to cope the edge provided by the VIG unit when it is in an unrestricted state. Also or alternatively, it may help to reduce stress conditions in some parts of the VIG unit In one or more aspects of the present disclosure, the largest total edge deflection of one or more of the edges of the VIG unit may be configured to be at least 10% smaller, such as at least 20% smaller, such as at least 30% smaller when compared to the largest total edge deflection of the vacuum insulated glass (VIG) unit in a substantially unrestricted condition at a temperature difference ($\Delta T = T1 - T2$) of at least 40° C., such as about 65° C.

In the unrestricted condition, it is understood that at least gravity applies on the VIG unit. This may e.g. be determined by providing a VIG unit that is not placed in a frame, and a similar VIG unit placed in in a frame, and determine/measure the largest edge deflections for each of these VIG units in the frame.

In one or more aspects of the present disclosure, the largest total edge deflection in said deflection direction of any of the edges of the vacuum insulated glass unit at a temperature difference between the two glass sheets of 65° C. as compared to the vacuum insulated glass unit at a temperature difference of 0° C. is at least 0.3% of the length of the deflecting edge, such as in the range of 0.3% to 3.5% of the length of the deflecting edge, such as in the range of 0.4% to 2% of the length of the deflecting edge, such as in the range of 0.6% to 1.5% of the length of the deflecting edge. In one or more further or alternative aspects of the present disclosure, the largest total edge deflection in said deflection direction of any of the edges of the vacuum insulated glass unit at a temperature difference between the two glass sheets of 40° C. as compared to the vacuum insulated glass unit at a temperature difference of 0° C. may be at least 0.15% of the length of the deflecting edge, such as in the range of 0.15% to 3% of the length of the deflecting edge, such as in the range of 0.25% to 1.8% of the length of the deflecting edge, such as in the range of 0.35% to 1.2% of the length of the deflecting edge.

In one or more aspects of the present disclosure, the bonding seal may have a width of between 2 mm and 30 mm, such as between 2 mm and 15 mm, such as between 2 mm and 6 mm. This may e.g. help to provide an improved handling of stress conditions in the VIG unit during thermal deflection of the VIG unit.

In one or more aspects of the present disclosure, the overlapped elongated frame member may comprise the resilient sealing gasket which is configured to abut the interior major surface of the vacuum insulated glass unit when the sash is in a closed position. This may e.g. help to enable a solution where, when the sash is partly opened, a larger glass sheet surface of the VIG is exposed and this may enable providing an increased inflow of light as the part of the VIG unit overlapping the fixation frame becomes visible. Also, it may give a viewer the opportunity to see al larger exposed interior surface of the VIG unit when the sash is opened. The viewer may here see a masking (if present) which may be hidden (at least a part or the entire masking may be hidden) and substantially not visible from the inside when the sash is closed.

In other further aspects of the present disclosure the resilient gasket that is deflected/compressed by the interior VIG unit surface when the sash is closed may instead be attached to the interior surface of the VIG unit, and/or attached to the sash profile.

In one or more aspects of the present disclosure, the vacuum insulated glass unit is a laminated vacuum insulated glass unit comprising a lamination interlayer bonding a further glass sheet to a major surface of the vacuum insulated glass unit. This may help to improve safety of the aperture cover in case the VIG unit should break. The lamination glass sheet may in aspects be arranged at the side facing the overlapped elongated frame member. In further aspects of the present disclosure, the lamination glass sheet may comprise or provide the interior major surface of the vacuum insulated glass unit which the resilient sealing gasket is configured to abut when the sash is in a closed position.

In one or more aspects of the present disclosure a minimum distance between an outer major surface of the vacuum insulated glass unit and walls of said frame may be at least 4 mm such at least 5 mm, for example at least 6 mm at a temperature difference ΔT between the two glass sheets of the vacuum insulated glass unit of substantially 0° C. This may e.g. provide more space and/or deflection freedom in order to allow the VIG unit to thermally deflect relative to the frame.

FIGURES

Figure 2:
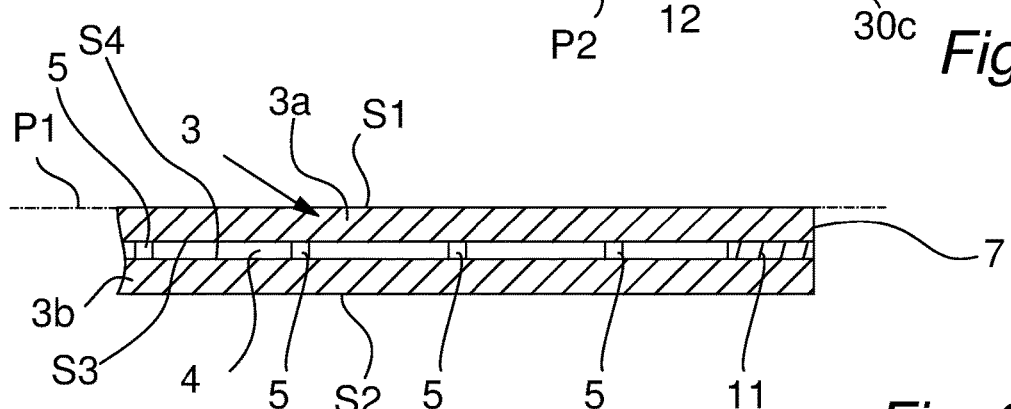
Figure 3:
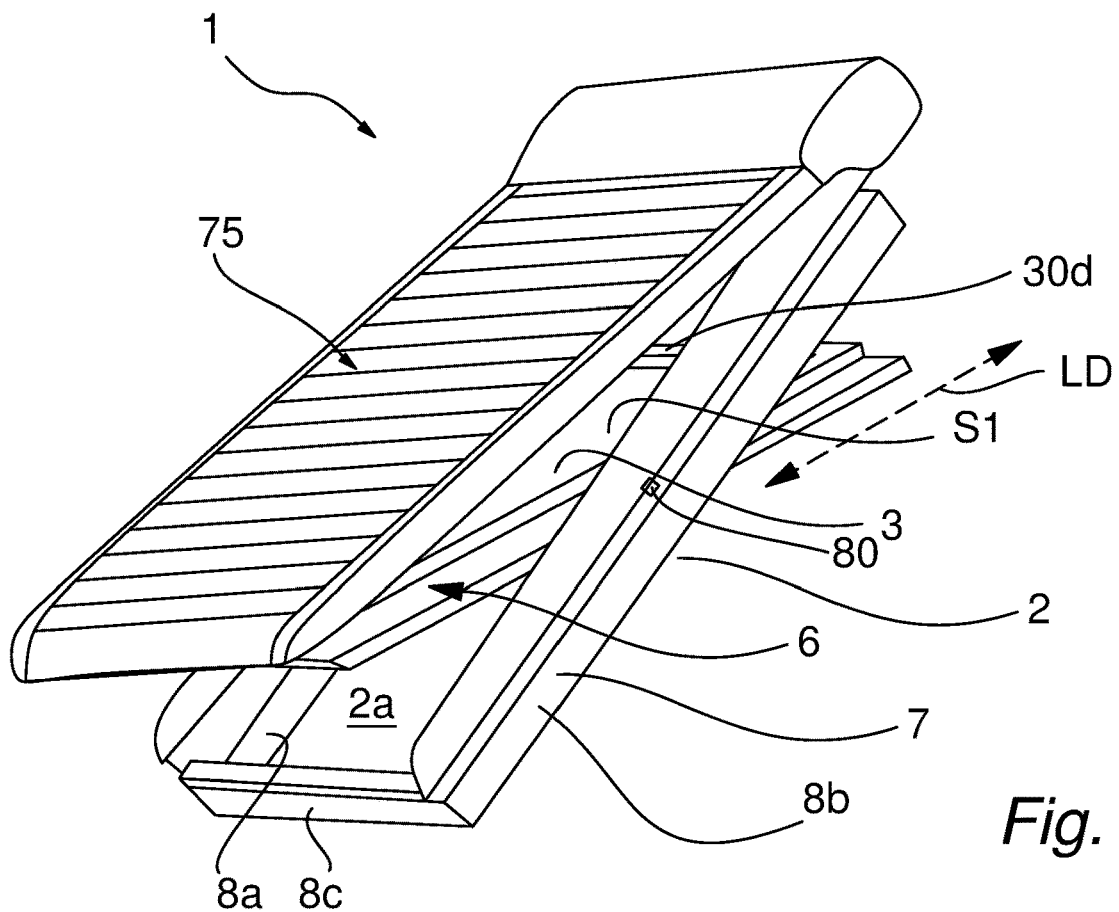
Figure 4:
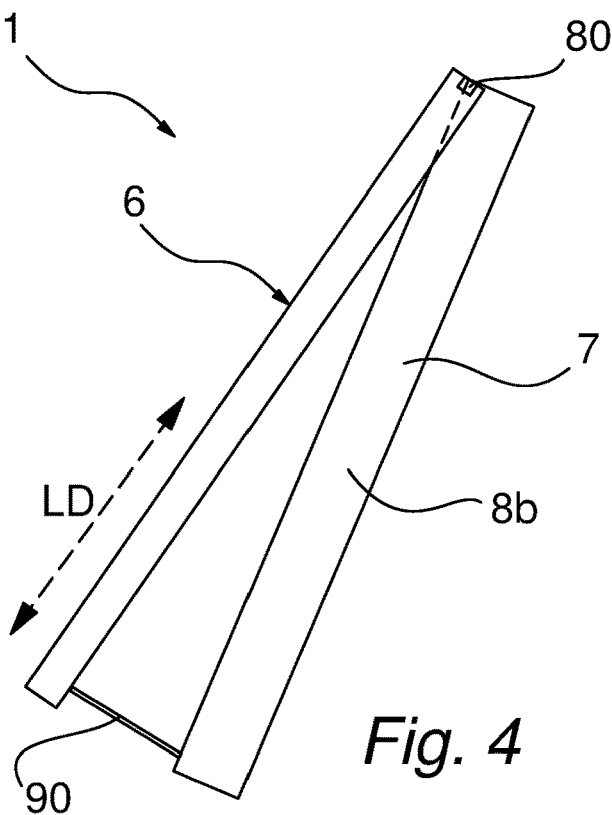
Figure 5A:
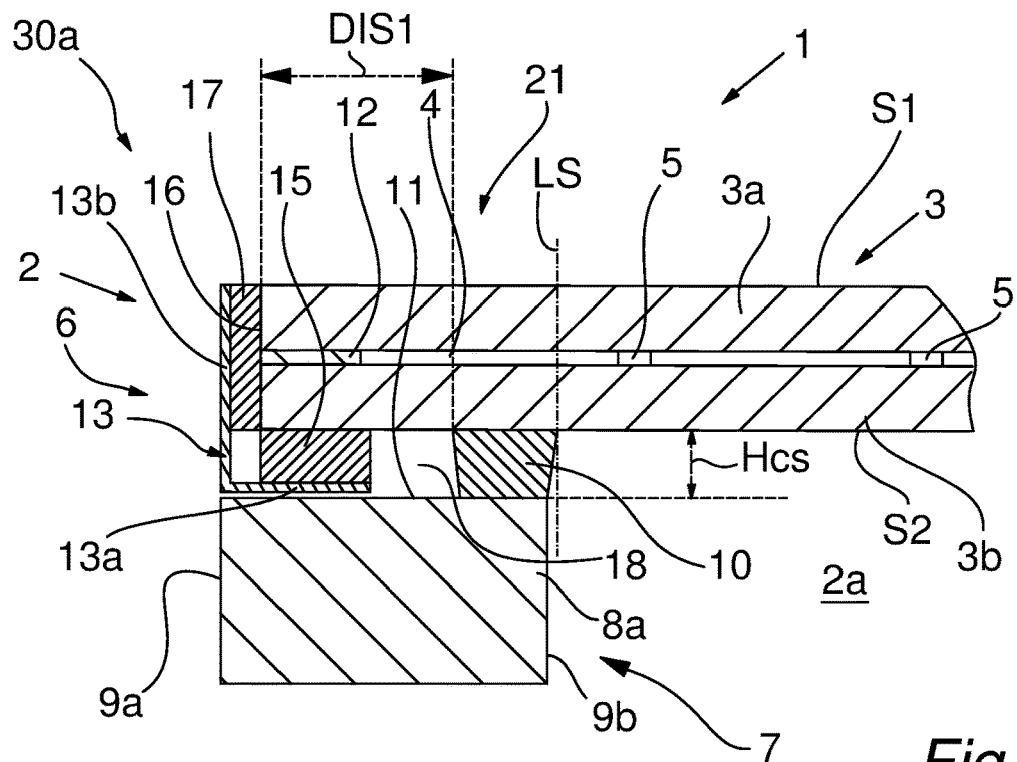
Figure 5B:
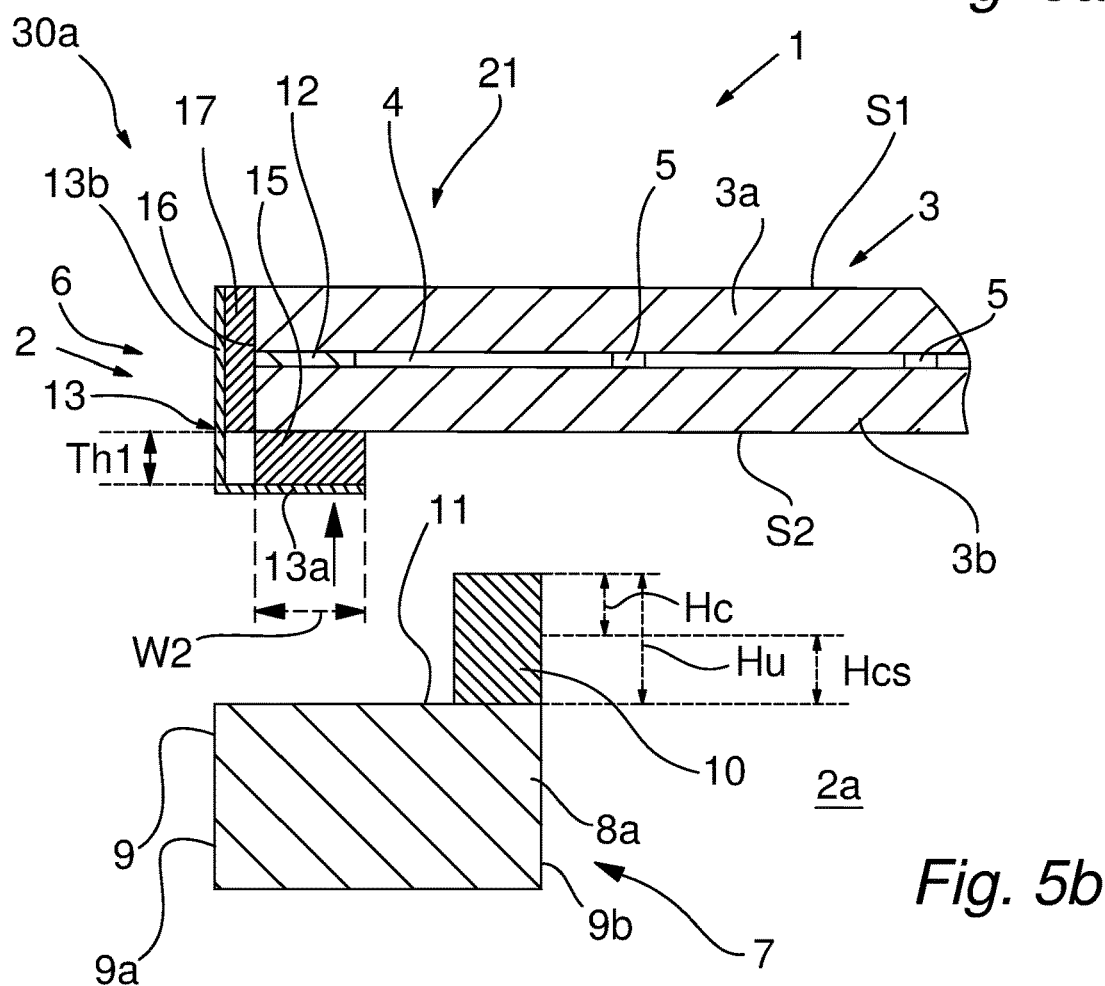
Figure 6:
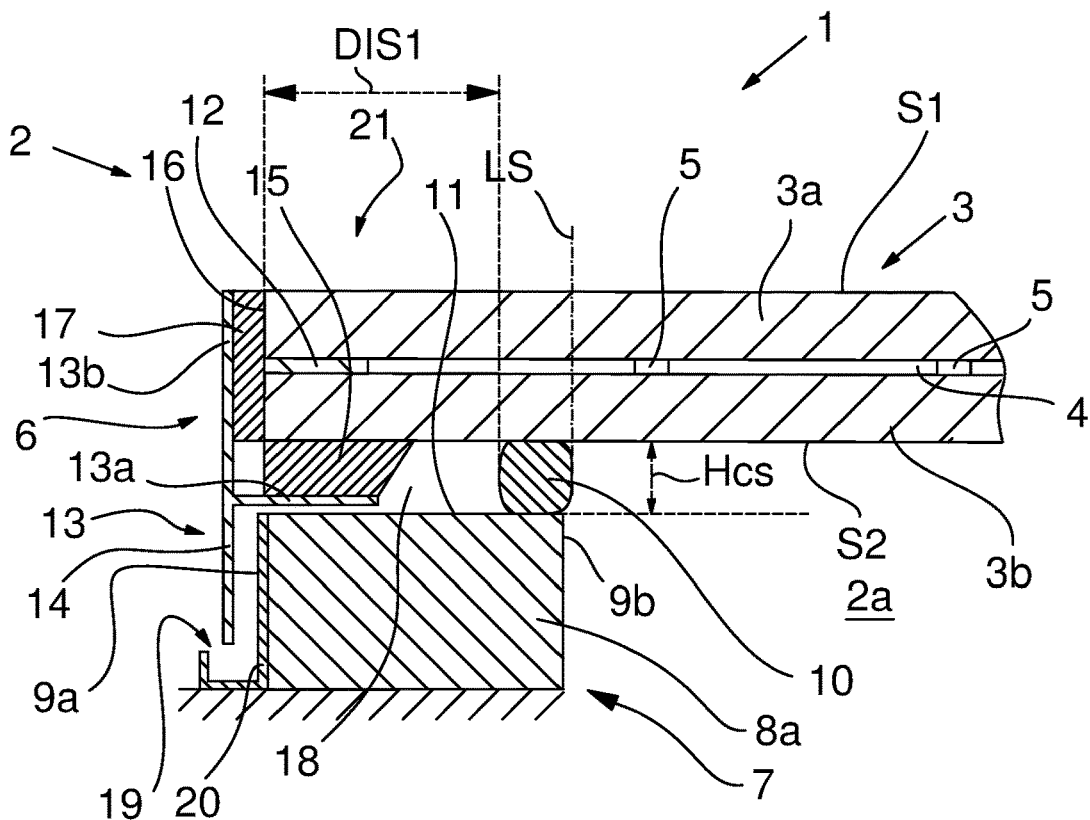
Figure 7:
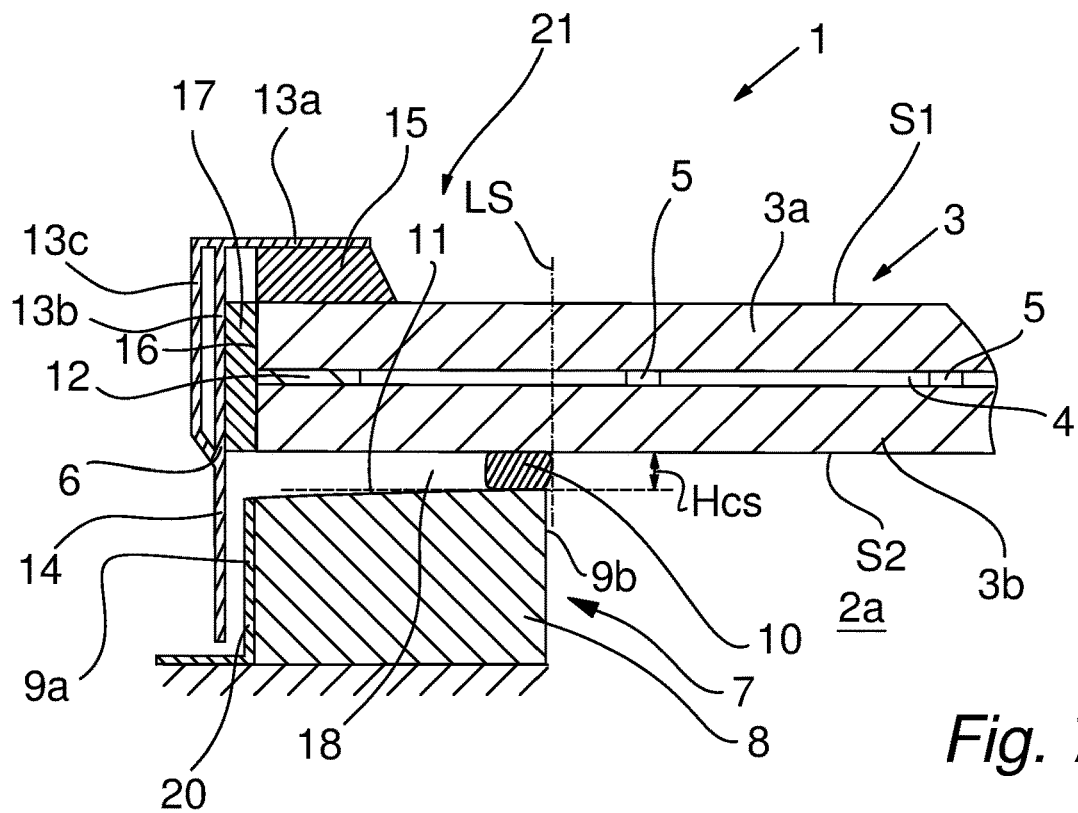
Figure 8:
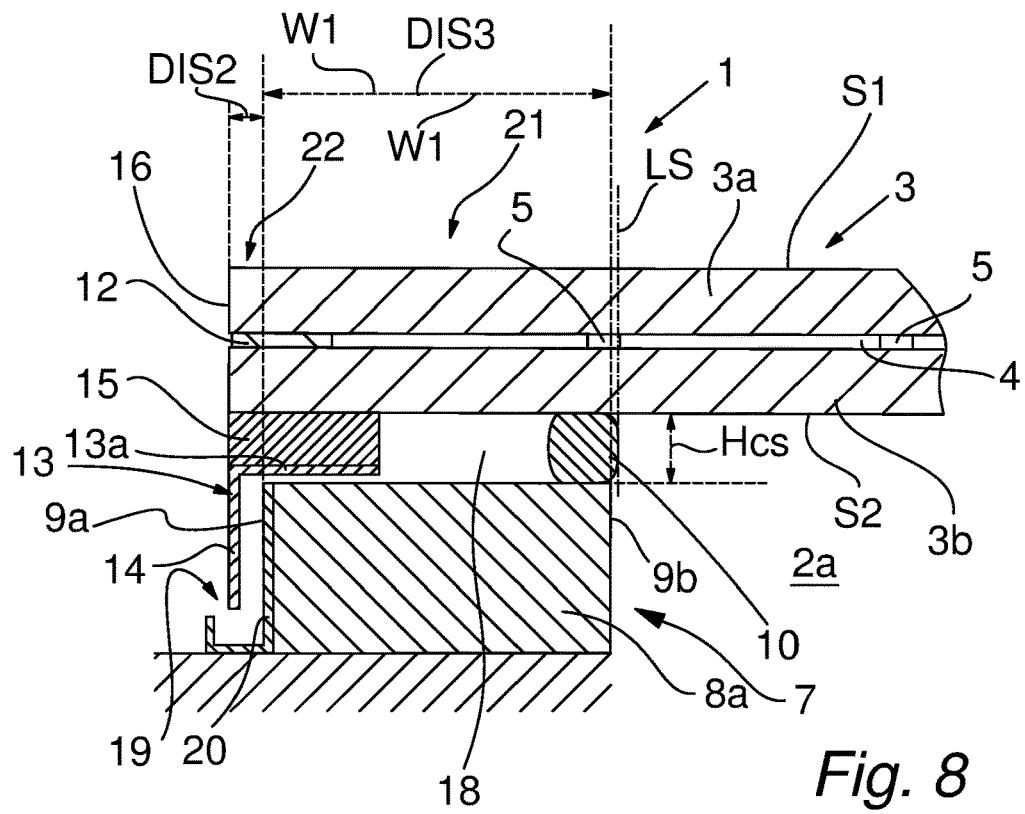
Figure 9A:
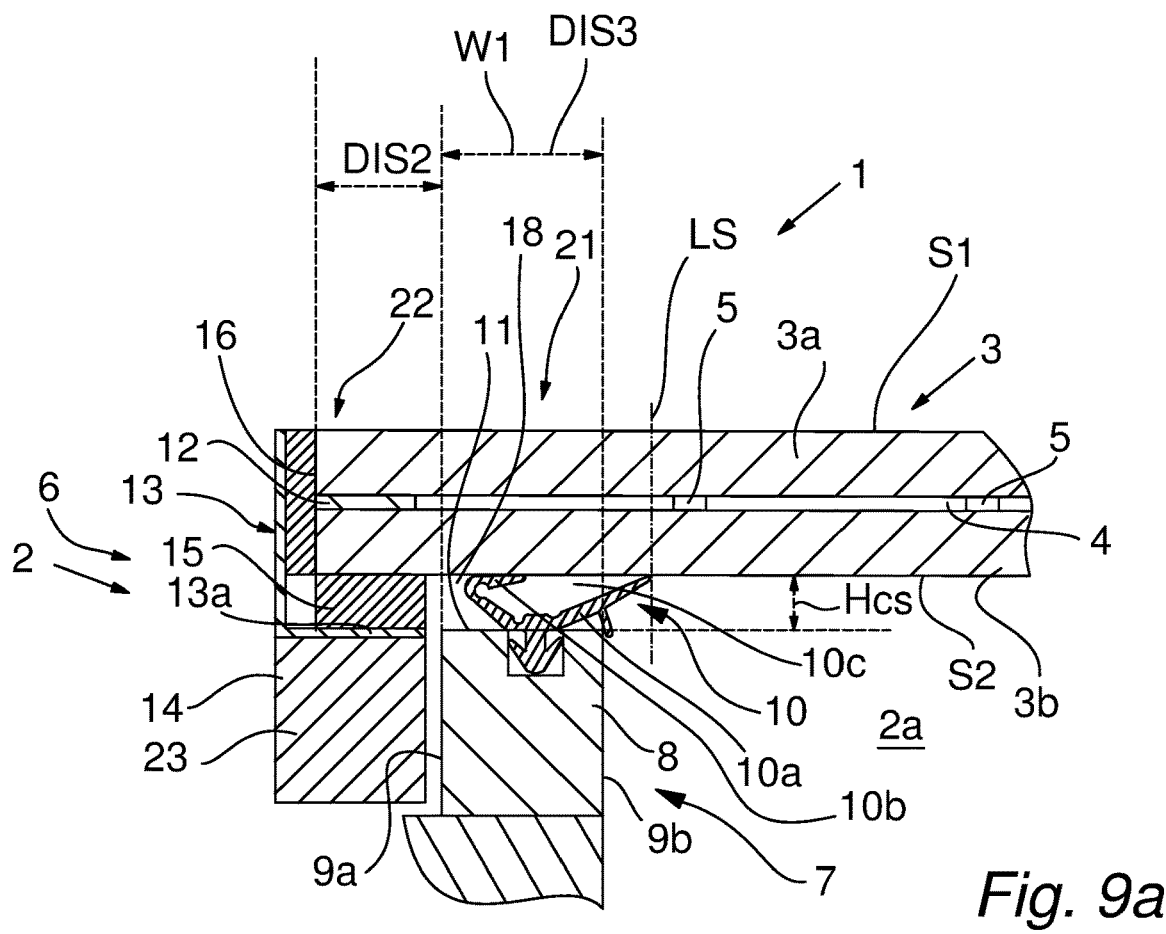
Figure 9B:
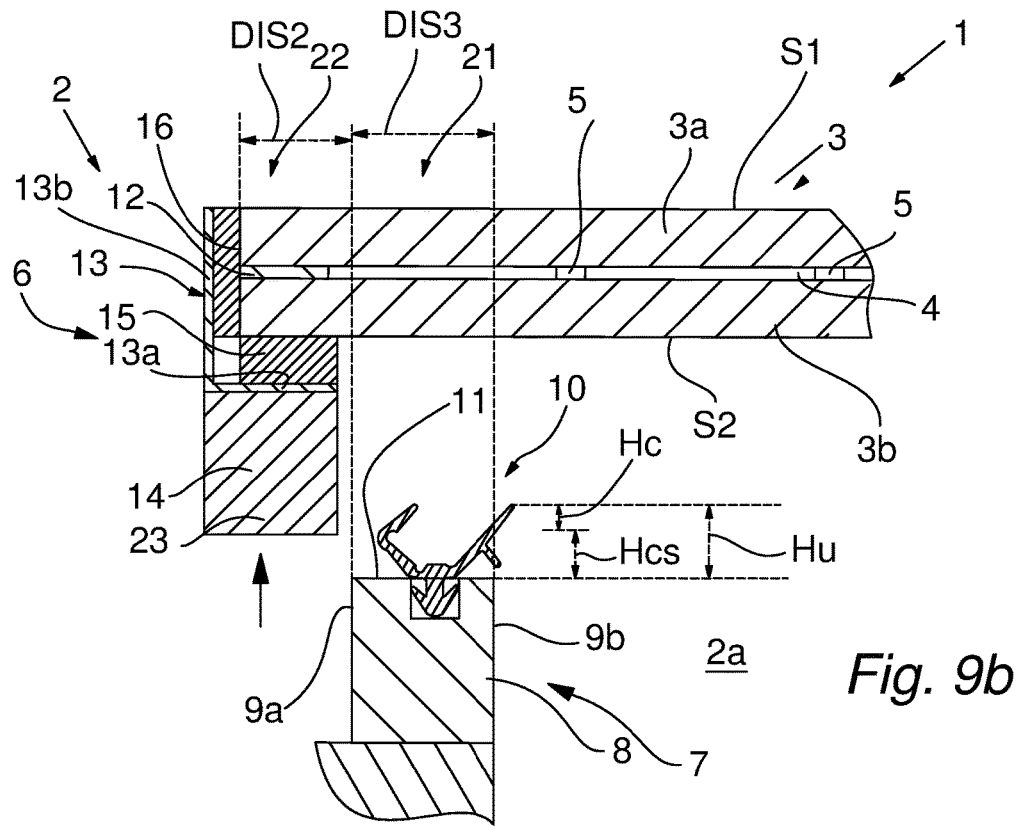

Aspects of the present disclosure will be described in the following with reference to the figures in which:

FIG. 1: illustrates an aperture cover such as a window or a door according to embodiments of the present disclosure, FIG. 2: illustrates a VIG unit according to embodiments of the present disclosure, FIGS. 3-4: illustrates building aperture covers which are roof window solutions according to embodiments of the present disclosure FIGS. 5a-5b: illustrates a VIG unit according to embodiments of the present disclosure, where a gasket is configured to abut an interior major surface of a VIG unit, FIG. 6: illustrates an aperture cover according to embodiments of the present disclosure, comprising a water skirt wall FIG. 7: illustrates an aperture cover according to various embodiments of the present disclosure, comprising a double walled construction and including a water skirt wall, FIG. 8: illustrates an aperture cover according to various embodiments of the present disclosure, where an edge surface of a VIG unit is exposed, FIGS. 9-9b: illustrates an aperture cover according to various embodiments of the present disclosure, wherein a sash profile is fixed to a VIG unit at a part of the VIG unit (3) that extends beyond an outer surface of the fixation frame.

Figure 10:
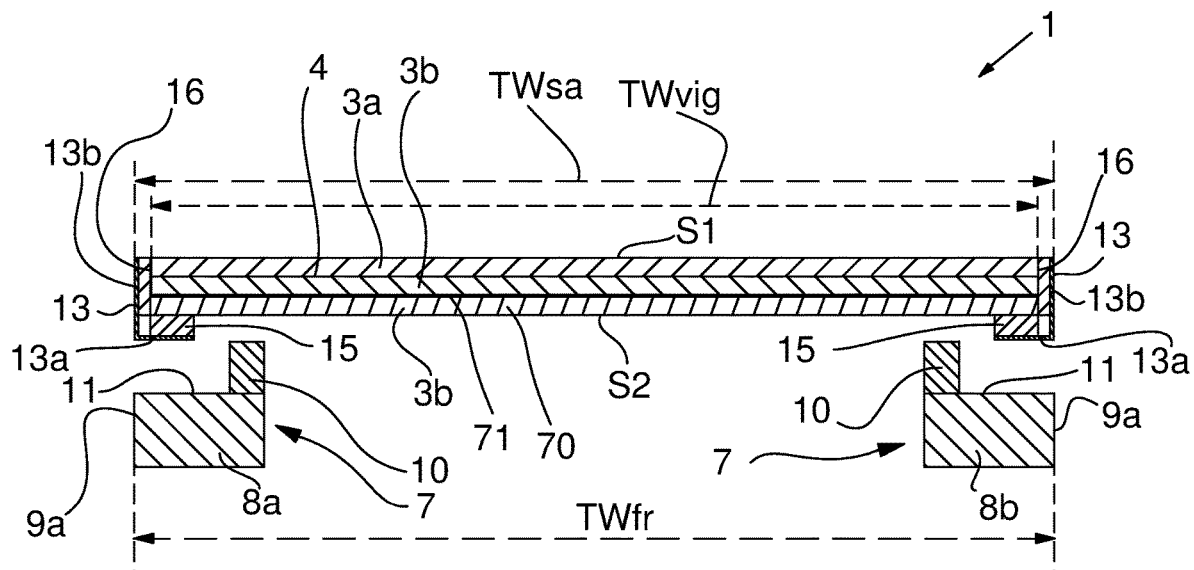
Figure 11:
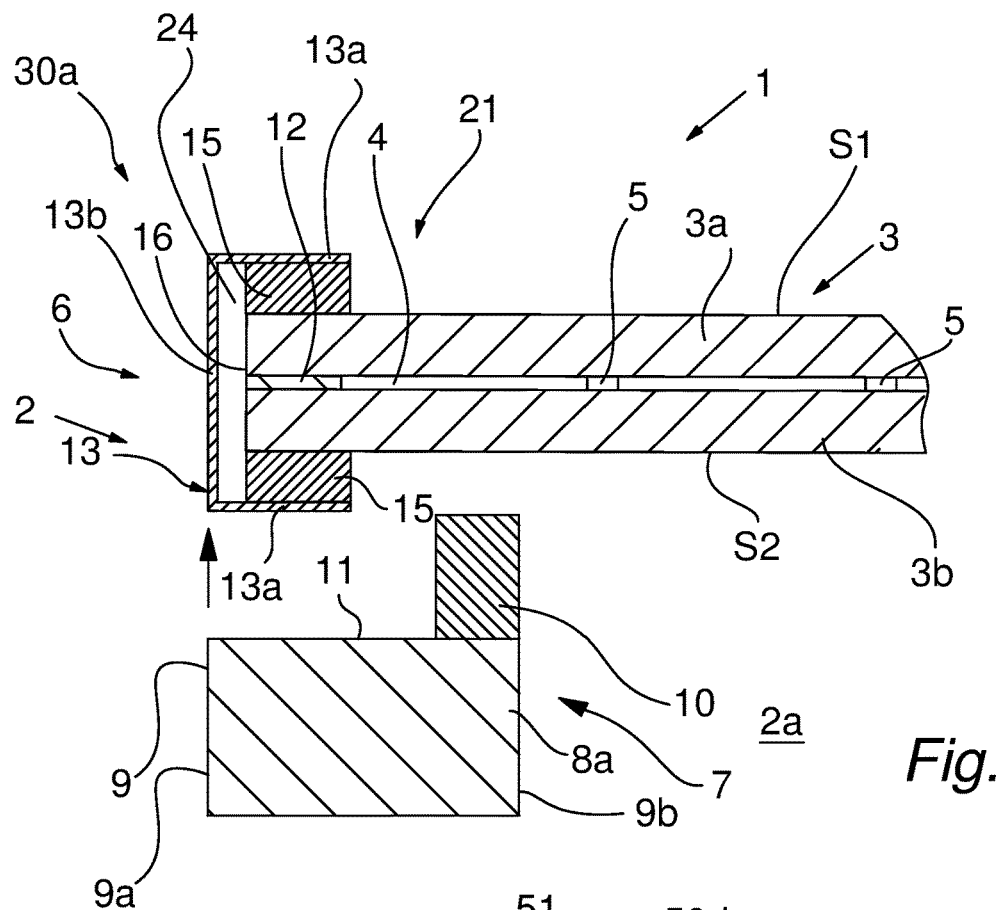
Figure 12:
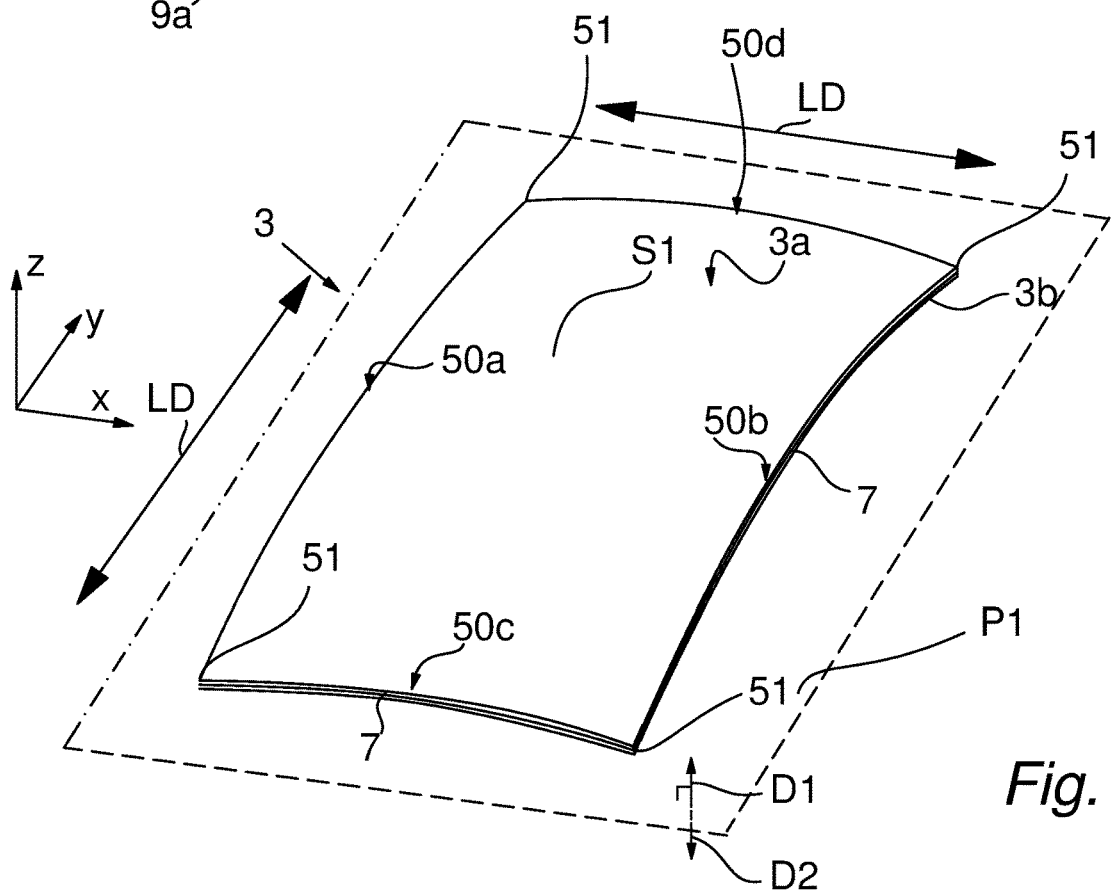
Figure 13:
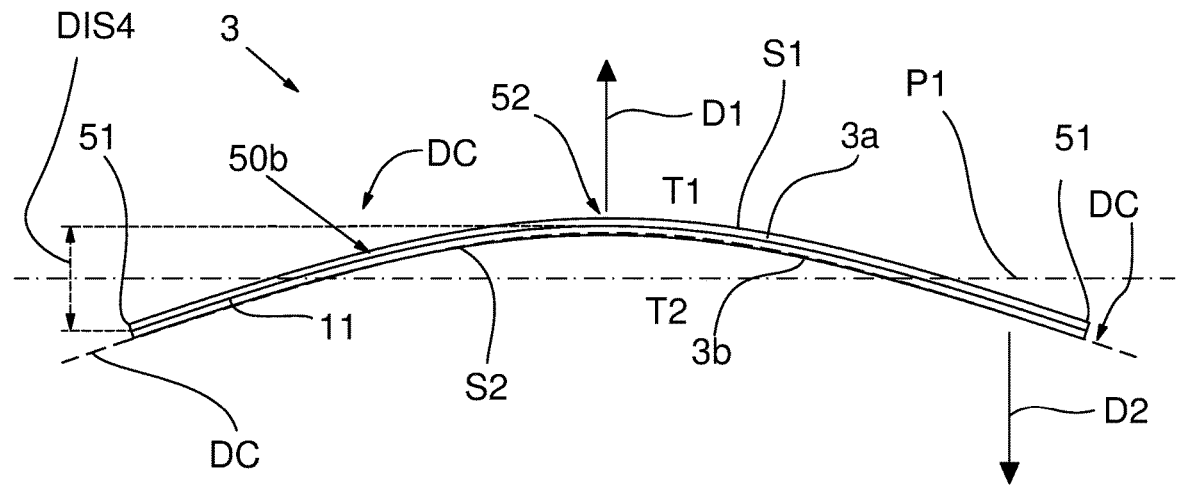
Figure 14:
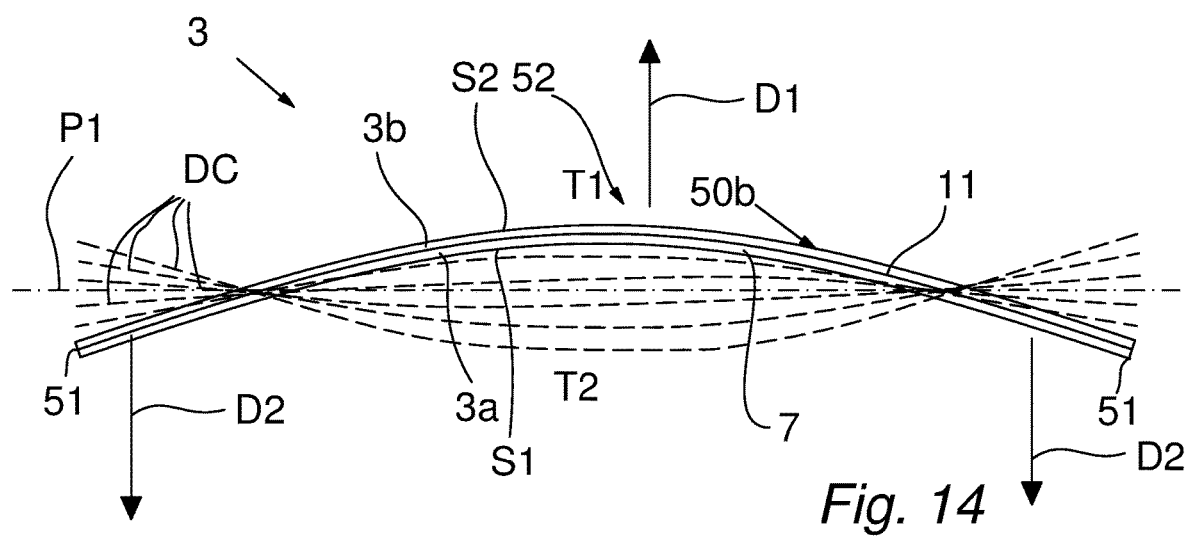
Figure 15:
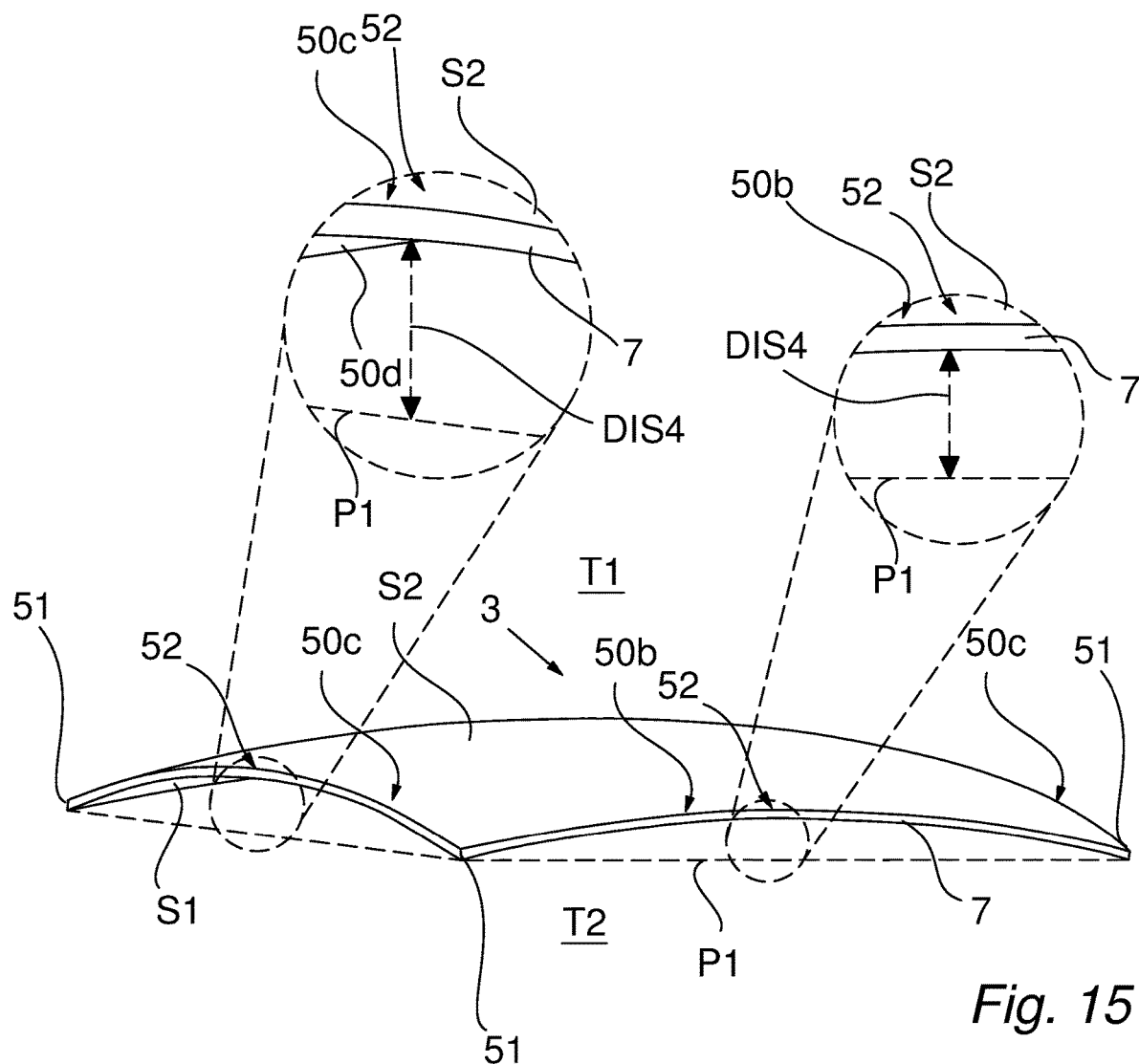
Figure 16:
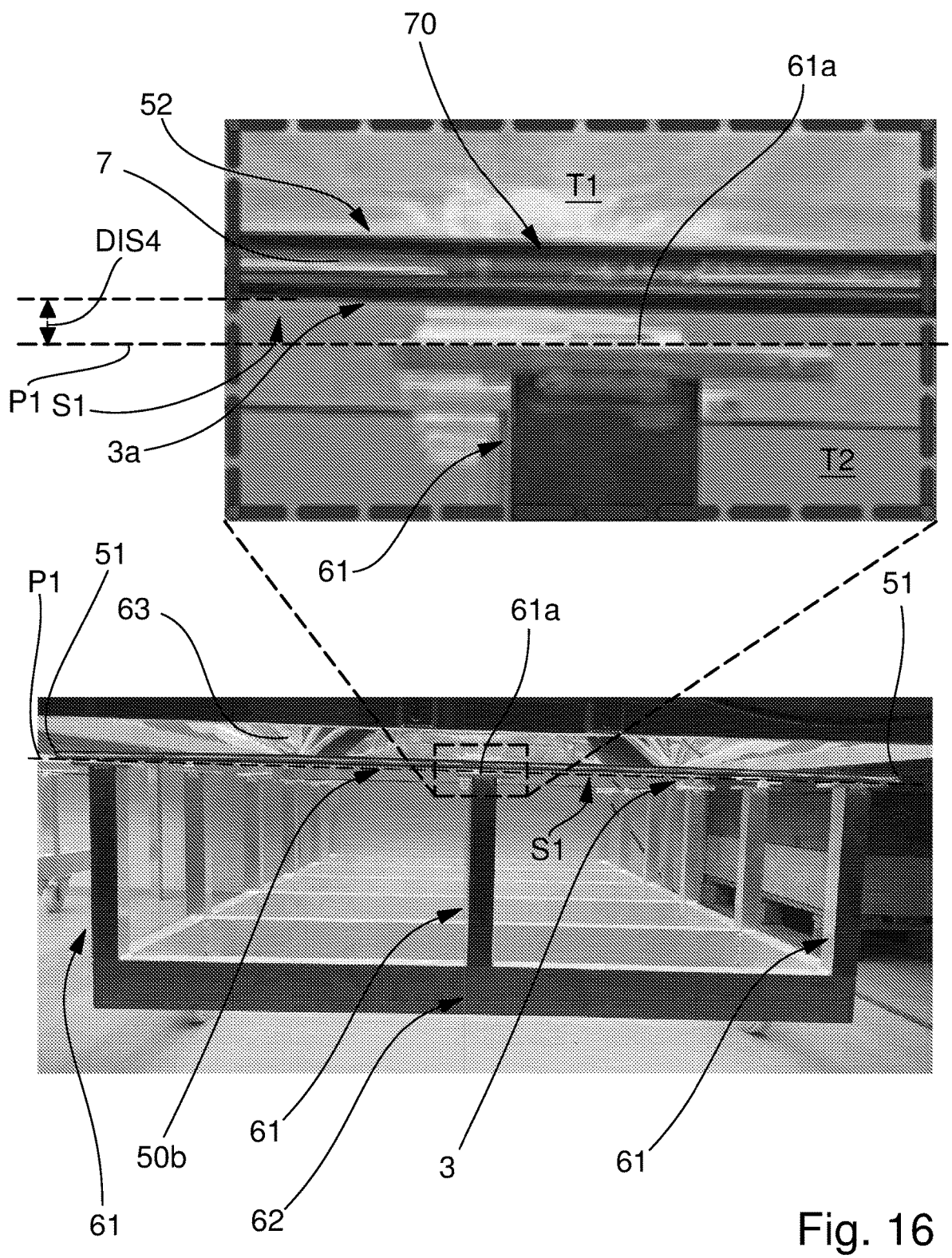
Figure 17:
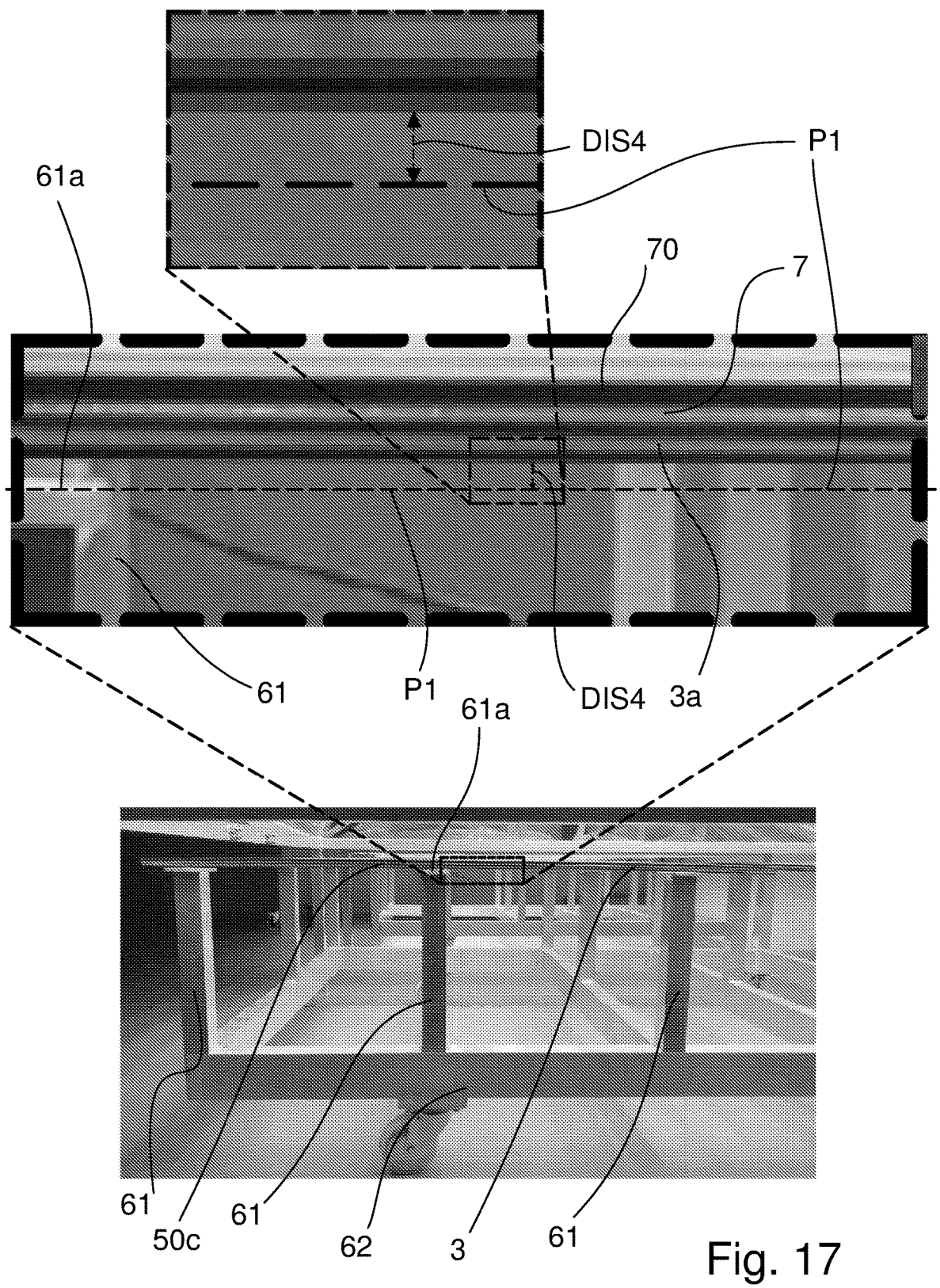

FIG. 10: illustrates an aperture cover according to various embodiments of the present disclosure, comprising a fixation frame and a sash, FIG. 11: illustrates an aperture cover according to various embodiments of the present disclosure comprising a clamping system, FIGS. 12-14: illustrates a VIG unit according to embodiments of the present disclosure, where the VIG unit is subjected to thermal deflection due to temperature difference between the glass sheets of the VIG unit, FIG. 15: illustrates a visualized computer simulation of a thermal deflection of a VIG unit, and FIGS. 16-17: illustrates a thermal deflection test of a laminated VIG unit.

DETAILED DESCRIPTION

In relation to the figures described below, where the present disclosure may be described with reference to various embodiments, without limiting the same, it is to be understood that the disclosed embodiments are merely illustrative of the present disclosure that may be embodied in various and alternative forms. The figures are not to scale; some features may be exaggerated or minimized to show details of particular components. Therefore, specific structural and functional details disclosed herein are not to be interpreted as limiting, but merely as a representative basis for e.g. teaching one skilled in the art to variously employ the present disclosure.

FIG. 1 illustrates schematically a building aperture cover in the form of a window 1 according to embodiments of the present disclosure. The window comprises a vacuum insulated glass (VIG) unit 3 fixed in a frame 2. The frame 2 comprises elongated structural frame arrangements 30a-30d, and the VIG unit 3 is arranged to cover a frame opening 2a in the frame. The frame defines a frame opening plane P2, and in FIG. 1, the window is seen from the outside towards the exterior surface S1 of the VIG unit.

The frame arrangements 30a-30d comprises substantially parallel top 30d and bottom 30c frame arrangements and substantially parallel side profile frame arrangements 30a, 30b. In FIG. 1, the VIG unit is arranged in a frame 2 in form of a sash which is connected to a fixation frame 7 (see the other figures such as FIG. 5a and onwards) by means of a displacement mechanism such as one or more hinged connections (not illustrated in FIG. 1, see FIGS. 3-4) configured to allow the sash to move relative to the fixation frame 7. Hence a user, such as a habitant living in a building comprising the window may open and close the window by operating the sash, either by hand or by a remote control, such as a wireless remote control that is configured to control an electrically operated actuator device such as a linear actuator such as a spindle or chain drive (not illustrated in FIG. 1.

A gasket arrangement 10, a bonding seal 15 (described in more details later on) and/or the like may in one or more embodiments of the present disclosure be arranged to seal a space between parts of the frame 2 and the VIG unit 3. In the present example, a gasket 10 at the interior surface of the VIG unit (see for example FIG. 5a-5b) defines a "line of sight" through the frame opening 2a and through the VIG unit 3 in the frame.

FIG. 2 illustrates schematically a cross sectional view of a VIG unit 3 to be arranged in the frame 2 according to embodiments of the present disclosure. The VIG unit 3 comprises two glass sheets 3a, 3b such as tempered glass sheets, e.g. thermally tempered glass sheets, but it is understood that one or both glass sheets 3a, 3b may also be float glass sheets such as annealed glass sheets.

The glass sheets 3a, 3b are separated by an evacuated gap 4 located between the glass sheets 3a, 3b, and a plurality of support structures 5 are distributed in the gap 4. The thickness/width of the gap 4 may for example be 0.05-0.5 mm such as between 0.09 mm and 0.25 mm (measured normal to a plane P1 defined by a major surface of one of the VIG unit glass sheets 3a, 3b at a temperature difference between the VIG glass sheets 3a, 3b of substantially 0° C. The gap 4 is sealed by an edge sealing 12, such as a fused edge sealing, which may e.g. be made from a solder glass material, e.g. low melting point temperature solder glass material, or a metal solder material.

The support structures 5 may for example be made from metal, such as a steel alloy, glass or a polymer composition and be arranged in a grid or another pattern to maintain the gap 4 between the glass sheets 3a, 3b when the gap 4 is evacuated to a pressure below e.g. $10^{-3}$ bar, such as below $10^{-4}$ bar, e.g. to about or below $10^{-3}$ mbar. The glass sheets 3a, 3b comprises major surfaces S3, S4 facing the gap 4, and the support structures 5 support on these inner major surfaces. The VIG unit also comprises outwardly facing major surfaces S1, S2 facing away from the gap 4. The Uc-value of the vacuum insulted glass unit may be below 0.7, such as below 0.6 or below 0.5.

Especially if the VIG unit glass sheets 3a, 3b are tempered glass sheets, the distance/pitch between neighbouring/adjacent support structures 5 may be above 3 cm or above 4 cm, such as between 3 cm and 6 cm or even more at least some locations in the evacuated VIG unit gap 4.

As described in more details later on, the VIG unit 1 may also be a laminated VIG unit and/or a VIG unit of a hybrid type comprising a further glass sheet providing a further sealed gap between this glass sheet and the VIG unit that may be filled with a gas.

The VIG unit's 3 thickness, measured between the outer, outwardly facing surfaces S1, S2 of the VIG unit, determined in a direction normal to these surfaces, may in embodiments be between 4-15 mm such as between 4-12 mm, e.g. 4-10 mm, This thickness may preferably include an optional lamination glass sheet and lamination interlayer.

The VIG unit 1 defines a VIG unit plane P1 that will extend parallel to or coincide with the frame opening plane P2 (see FIG. 1) when the VIG unit is arranged in the frame. This plane P1 may e.g. be determined when the VIG unit glass sheets 3a, 3b have the substantially same temperature and no substantial thermal deflection of the VIG unit occur, i.e. when a temperature difference (ΔT) between the glass sheets 3a, 3b enclosing the gap is substantially 0 (ΔT=0° C.).

FIG. 3 schematically illustrates an embodiment of the present disclosure, wherein the aperture cover is a building aperture cover in the form of a roof window 1. The roof window 1 is configured to be placed in a roofing structure of a building, such as a building for habitants, an office building or the like. The roof window may in embodiments of the present disclosure be arranged between two roof trusses, but it may also be arranged to another part of the roof structure in further embodiments. The roof window may either be configured to be arranged with an angle between 5° and 85°, such s between 10° and 75°, compared to horizontal, and rain and melting water, dew and the like will thus be guided towards a bottom part/end of the window due to gravity.

The roof window 1 comprises a frame 2 in the form of a movable sash 6 which is connected to a fixation frame 7 by means of a displacement mechanism 80 such as one or more hinged connections configured to allow the sash 6 to move relative to the fixation frame 7. In the example of FIG. 3, the roof window is a pivot roof windows comprising pivot hinges 80 providing an axis of rotation placed between the top and bottom of the sash. Often the axis of rotation is substantially about the centre. But sometimes the axis of rotation can for example be raised such as ⅓ of the total window or sash height. The hinge connection 80 is so that a top end part of the sash 6 is configured to move inwards and a bottom end part of the sash 6 is configured to move outwards when opening the sash from a closed position.

A pivot roof window may e.g. allow rotation of the sash 6 so the exterior surface S1 of the VIG unit may be cleaned from the inside. The weather proofing and water drain for especially roof windows should be carefully designed for roof windows that can be opened, including pivoting roof windows.

As can further be seen, the roof window in FIG. 3 may in embodiments of the present disclosure comprise an architectural covering 75, in the present example a roller shutter, but it may also be a blind such as a venetian blind, a roller blind or the like in further embodiments. The roller shutter may be electrically operated by means of an electric motor (not illustrated), so as to open or close the roller shutter and controlled by an automation solution and/or by means of a wired or wireless remote control. As can be seen, the roller shutter can be placed at the exterior side of the window.

It is however understood that in further embodiments of the present disclosure, the roller shutter and/or other types of architectural coverings may be omitted from the roof window.

FIG. 4 schematically illustrates a roof window 1 according to an embodiment of the present disclosure, seen from the side, wherein the roof window is a top-hung roof window. Here, the sash 6 is connected to the fixation frame 7 at the top part by a hinge arrangement, and the top part does hence not pivot inwards when the sash 6 with the VIG unit is opened.

Generally, for both types of roof windows as illustrated in FIGS. 3 and 4, the window may as illustrated in FIG. 4 be assigned with an electric actuator 90 such as a spindle actuator or chain actuator. The actuator 90 can be operated by an input from an automation system or a wired or wireless remote control to open or closed the sash 6. The actuator 90 may be arranged at the top part (relevant for the pivot roof window, see FIG. 3) or bottom part of the sash 6 as illustrated in FIG. 4.

FIGS. 5a-5b illustrates an embodiment of an elongated frame arrangement 30a of a frame 2 according to embodiments of the present disclosure, seen through the cross sectional view A-A of FIG. 1. In FIGS. 5a and 5b, the view is through an elongated side frame arrangement 30a, but it is generally understood that for both the embodiments disclosed in FIGS. 5a-5b, as well as the embodiments illustrated in and/or described in relation to the figures described later on, may apply for one, two, three or all four of the elongated frame arrangements 30a-30d, such as for both side arrangements 30a, 30b and/or a bottom frame arrangement 30c and/or the top arrangement 30d.

The aperture cover 1 in FIG. 5a-5b may in embodiments of the present disclosure be a building aperture cover in the form of a window, such as a roof widow or alternatively a vertical window to be installed in an outer wall of a building, The aperture cover 1 comprises a frame 2 with a vacuum insulated glass (VIG) unit 3 with an outer major exterior surface S1 and an outer major interior surface S2. The frame 2 comprises a fixation frame 7 and a sash 6 fixed to the vacuum insulated glass unit 3. The sash 6 is movably connected to the fixation frame 7 by means of a hinge connection 80 (not illustrated in FIGS. 5a-5b, see e.g. FIGS. 3-4). The fixation frame 7 comprises an elongated frame member 8a which, together with other elongated frame members of the fixation frame which are parallel to and/or perpendicular to the frame member 8a, defines a frame opening 2a.

The vacuum insulated unit 3 overlaps a surface 11 of the elongated frame member 8a of the fixation frame 7, so that the surface 11 faces the interior major surface S2. The evacuated gap 4 extends in over and overlaps the frame member 8a, so that the edge seal material 12 is moved away from the line of sight and further in over (or beyond—see FIGS. 8-9b) the frame.

Moreover, the sash 6 comprises a sash profile 13 which is fixed to the VIG unit 3. In FIGS. 5a-5b, the sash profile 13 is fixed to the VIG unit by means of a bonding seal, such as a structural adhesive, at a part 21 of the VIG unit 3 that overlaps the elongated frame member 8a, above a surface 11 of the member 8a.

The overlapped elongated frame member 8a is an elongated structural member. The overlapped elongated frame member 8a may in embodiments of the present disclosure be or comprise a wood a member of a wood material such as a softer wood material such as pine wood or harder wood such as oak, beech, mahogany or the like. The wood may be laminated. Also or alternatively, the overlapped elongated frame member 8a may be or comprise a member comprising or made from a polymer material such as a plastic material, such as PVC or PUR, and/or a composite profile comprising carbon fibres and/or glass fibres. In still further embodiments, the frame member 8a may comprise or be made from a metal such as aluminium, for example made from aluminium shells joined by thermal breaks.

The overlapped member 8a may either be solid (as illustrated) or hollow and thus comprise insulating cavities that may be filled with air or a desired insulating gas species, or an insulating material such as an insulating polymer based foam, mineral wool and/or the like. The overlapped member may in further embodiments of the present disclosure comprise one or more strengthening elongated members (not illustrated) embedded in the overlapped member such as in one or more walls in order to provide a structural member 8a with increased inherent rigidity. These/this strengthening member(s) may be co-extruded and/or pultruded with the walls. The strengthening members may e.g. be made from a material such as carbon fibre or glass fibre, it may e.g. be carbon or glass fibre rods or wires, it may be a metal such as steel or aluminium, or it may be a rigid polymer, such as fibre reinforced polymer material.

The overlapped elongated frame member 8a comprises a resilient sealing gasket 10. This resilient sealing gasket 10 may be a rubber gasket (e.g. natural and/or synthetic rubber), a foam gasket, an elastomer gasket or the like. The gasket 10 is a gasket strip that abuts the interior major surface S2 of the VIG unit when the sash 6 is in a closed position as illustrated in FIG. 5a. The interior major surface S2 of the VIG unit thereby compresses/deflects the resilient sealing gasket 10 when moving the sash 6 from an open to a closed position, and keeps the gasket 10 in a compressed state in the closed position.

It is understood that in other embodiments of the present disclosure (not illustrated), the gasket 10 may instead be attached to the interior surface of the VIG unit, and/or attached to the sash profile 13.

The sash is kept in a closed position to compress/deflect the gasket by a locking mechanism (not illustrated) such as by means of a locking member actuated by a manually operated handle, and/or by means of a locking mechanism provided by means of an actuator as described earlier. If the aperture cover 1 is a roof window, gravity may also help to provide a certain level of the compression of the gasket 10.

The resilient sealing gasket 10 is positioned between a part of the sash 6 and the frame opening 2a when the sash 6 is in a closed position, in a space 18 provided between the surface 11 of the overlapped elongated frame member 8a of the fixation frame 7 and the interior major surface S2 of the vacuum insulated glass unit. The gasket 10 may, as illustrated, deform into the space 18 when compressed by the surface S2.

In embodiments of the present disclosure, a minimum distance between an outer major surface S1, S2 of the vacuum insulated glass unit and walls/surfaces 13a, 11 of the frame may be at least 4 mm such at least 5 mm, for example at least 6 mm at a temperature difference $\Delta T = T1 - T2$ between the two glass sheets 3a, 3b of the vacuum insulated glass unit 3 of substantially 0° C.

When the sash 6 is opened (see FIG. 5b), at least a part of the gasket 10 expands from the compressed/deflected state due to the inherent resiliency of the gasket, and hence recovers to it's original un-compressed/un-deflected shape. Hence, FIG. 5b illustrates the gasket 10 in an un-compressed, and thus expanded state. In FIG. 5a, the gasket 10 is in a compressed/deflected state Hcs, where it is compressed by the VIG unit surface S2, and when the sash 6 is opened, the gasket 10 moves/expands to the uncompressed state where it has the height Hu, see FIG. 5b.

The sealing gasket 10 may in embodiments of the present disclosure be configured to be compressed Hc by between 2 mm and 15 mm, such as between 3 mm and 9 mm, for example between 4 mm and 8 mm by the interior major surface S2 of the vacuum insulated glass unit when compared to the sealing gasket in an uncompressed condition. This thickness is defined/determined at a temperature difference between the VIG unit's glass sheets 3a, 3b that encloses the evacuated gap 4 of substantially 0° C.

The height Hc may in embodiments of the present disclosure be at least 2 mm, such as at least 4 mm, for example by at least 6 mm.

The height Hu of the resilient sealing gasket 10 in the uncompressed state may in embodiments of the present disclosure be between 5 mm and 25 mm, such as between 5 mm and 15 mm, for example between 6 mm and 10 mm in an uncompressed condition.

The uncompressed height Hu of the resilient sealing gasket 10 in the uncompressed state may in embodiments of the present disclosure be at least 5 mm, for example at least 6 mm, of at least 8 mm or 10 mm in an uncompressed condition.

For example, a gasket 10 having an uncompressed/un-deflected height Hu of 10 mm may in embodiments of the present disclosure be compressed (Hc) between 4 mm and 8 mm by the VIG unit. Hence, when the sash 6 is opened, the gasket 10 in this example expands between 4 mm and 8 mm from the compressed state Hcs.

It is though understood that the magnitude of the compression of the gasket 10 may vary over time, and also vary along the longitudinal direction LD of the gasket due to a thermal deflection of the VIG unit 3 as described in more details later on. It is generally understood that the selected uncompressed/undeflected height Hu and the general dimensions and/or resilient characteristics of the gasket 10, as well as the magnitude of the compression Hc, may vary dependent on the size (length and width) of the VIG unit, and/or dependent on the application, i.e. whether the aperture cover is a vertical window, a roof window or if it is for use in cooling furniture or the like.

For example, the magnitude Hc of the compression of the sealing gasket 10 by the vacuum insulated glass unit may vary across the length LD of the sealing gasket 10 when the temperature difference between the two glass sheets 3a, 3b of the vacuum insulated glass unit is 40° C. or 65° C.

The sealing gasket 10 is placed with a distance DIS1 from the edge surface 16 of the VIG unit 3. In embodiments of the present disclosure, the sealing gasket may be placed at least 25 mm such as at least at least 35 mm, for example at least 50 mm, from the edge of the vacuum insulated glass unit when the sash is in a closed position, in order to keep the edge seal 12 at a larger distance from the inner surface 9b of the overlapped member 8a of the fixation frame, and hence reduce heat transfer. For example, the distance DIS1 may in embodiments of the present disclosure be between 25 mm to 85 mm, such as between 35 mm to 60 mm, or between 50 mm and 80 mm or between 25 mm and 50 mm.

The sash 6 comprises the elongated sash profile(s) 13. This may be a metal profile, for example aluminium profile or a steel profile, or it may comprise of be a plastic based profile such as a PUR or PVC profile, or a composite material profile such as a carbon fibre or glass fibre containing profile. The VIG unit 3 is fixed to a fixation wall 13a of the elongated sash profile 13 by means of a bonding seal 15 attached to an outer major surface (S1, S2) of the vacuum insulated glass unit. The profile 13 may in embodiments of the present disclosure be an extruded or pultruded profile, or it may be a roll formed/shaped profile.

In FIGS. 5a-5b and some of the other figures described below, the sash profile comprises the fixation wall and a protection wall 13b extending opposite to the VIG unit edge surface 16 that extends between the two major surfaces. The protection wall 13b may be omitted in embodiments of the present disclosure as illustrated in e.g. FIG. 8.

The bonding seal 15 may be or comprise a structural adhesive such as a silicon adhesive, a silane-terminated polyurethane (SPUR) adhesive or a Modified-Silyl Polymer (SMP) adhesive, and/or may comprise a butyl sealing material. The bonding material 15 is terminated at the outer major surface S2 so that the edge surface 16 of the vacuum insulated glass unit is unbonded to the bonding seal material 15.

The bonding seal 9 material preferably be harder and/or less resilient than the gasket 10 at the same temperature (such as at 20° C.).

The bonding seal 15 has a thickness Th1 (see FIG. 5b). The thickness Th1 is in some embodiments of the present disclosure preferably above 5 mm or above 6 mm. In embodiments of the present disclosure, the thickness Th1 may be between 4 mm and 15 mm, such as between 4 mm and 10 mm, for example between 5 and 10 mm, at a temperature difference between the two glass sheets 3a, 3b of the vacuum insulated glass unit of substantially 0° C. The thickness may be adapted according to the size (length and width) of the VIG unit. In some embodiments, for smaller (length and width) VIG units the thickness Th1 may be smaller than for larger VIG units being longer and/or wider. This thickness Th1 is determined in a direction substantially perpendicular to the major surface S2 (or S1—see FIG. 7) to which the bonding seal is attached, at a temperature difference between the glass sheets 3a, 3b of the VIG unit of substantially 0° C.

In FIGS. 5a-5b and several of the other figures described herein, the sealing gasket 10 defines a line of sight LS for a view through the frame opening 2a and the vacuum insulated glass unit 3 when the sash is in a closed position.

The line of sight LS may generally be defined by an envisaged line that is perpendicular to the interior surface S2 of the VIG unit and which provides the outermost border for a view through the VIG unit and frame opening 2a from the interior side of the VIG unit when the sash is closed.

FIGS. 5a-5b moreover illustrates an embodiment of the present disclosure wherein the sash profile 13, comprises a protection wall 13b extending opposite to the edge surface 16 of the vacuum insulated glass unit. As illustrated, a resilient weather protection sealing 17 is placed between the protection wall and the edge surface of the vacuum insulated glass unit. This sealing may be a butyl sealing, a rubber or elastomer sealing, or a foam sealing, and may adhere to one or both of the surface 16 and/or the protection wall 13b. The sash may also in embodiments be connected to the fixation frame by means of a hinge connection, by means of the protection wall 13b.

In the illustrated embodiment, the protection wall 13b overlaps the edge surface of both glass sheets 3a, 3b of the vacuum insulated glass unit. In case that the VIG unit is a laminated VIG unit, the protection wall may also overlap the edge surface of a lamination glass sheet (see FIG. 10).

The overlapped elongated frame member 8a comprises an outer frame surface 9a facing away from the frame opening 2a, and an inner surface 9b facing the frame opening. The sash profile 13 is in FIGS. 5a and 5b substantially flush with the outer surface 9a, or at least the outermost part of the surface fixation frame, see e.g. FIG. 8 where the outermost part of the fixation frame is defined by a profile of the frame 6 with a water guidance channel. Alternatively, the edge 16 may in embodiments of the present disclosure be flush with the outermost part of the frame 6, see FIG. 8.

In FIG. 5a-5b, the exterior surface S1 of the VIG unit is exposed so that substantially no part of the sash extends in over the surface S1 near the edge. Hence, the bonding seal 12 is the seal that fixates the VIG unit to the sash. It is though understood that additionally or alternatively, the fixation of the VIG unit 3 to the sash 6 may in further embodiments of the present disclosure be provided by a clamping force provided between members of the sash (not illustrated in FIGS. 5a-5b, see FIG. 11), such as between members of the sash profile 13, so that these can provide a counter pressure so that bonding seals or the like can provide a clamping force and fixate the VIG unit to the sash 6.

The bonding seal 15 may be located opposite to the evacuated gap 4 alone (not illustrated), but it may also be arranged to lap in over and thus be opposite to the edge seal 11 of the vacuum insulated glass unit (see FIGS. 5a-5b). The bonding seal 15 may be moved further in over the gap 4, away from the edge 7 in order to allow a more free thermal deflection of the VIG edge, or may be moved further towards the edge 7a.

In embodiments of the present disclosure, the bonding seal 15 may have a width W2 of between 2 mm and 30 mm, such as between 3 mm and 15 mm, for example between 4 mm and 13 mm, measured in a direction perpendicular to the surface 7 and to the longitudinal extent LD of the bonding seal 9, and parallel to the outer surface of the VIG unit to which it bonds.

The bonding seal 15 width W2 may in embodiments of the present disclosure be above 2 mm, such as above 4 mm, for example above 6 mm or above 8 mm. The bonding seal 15 width W2 may in embodiments of the present disclosure be below 15 mm, for example below 10 mm below 6 mm or about or below 4 mm.

In embodiments of the present disclosure, the width W2 may be between 2 mm and 15 mm, such as between 2 mm and 10 mm, such as between 2 mm and 6 mm or between 2 and 4 mm.

The width W2 may be substantially constant in the entire length of the bonding seal 15 (at a temperature difference between VIG glass sheets 3a, 3b of substantially 0° C.), or may alternatively be varied to be different around/near the corner area of the VIG unit 3 which may be from the corner of the edge and up to between 10 cm and 25 cm from the corner in the longitudinal direction of the edge surface 7 and the bonding seal, when compared to the width W2 at the remaining part of the edge of the VIG unit 3.

A masking (not illustrated) such as a sheet, plate or coating, such as a ceramic coating, may in embodiments of the present disclosure be arranged at the VIG unit opposite to the member 8a and the sash in order to hide a part of the structural member 8 and/or a gasket 10, that may otherwise be visible through the VIG unit from the outside. This may help to provide the impression of a larger window surface and hence narrower frame, while at the same time hiding parts of the frame from the outside. In case of the ceramic coating, it may be provided as a coating burned into/onto the glass during a tempering of the glass sheet 3a or 3b.

FIG. 6 illustrates an embodiment of the present disclosure where the sash profile 13 moreover comprises a water skirt wall 14 configured to extend over and cover a part of the outer frame surface 9a, at least when the sash is in a closed position. This may be especially relevant if the aperture cover 1 is a roof window. The skirt wall 14 overlaps the surface, and hence rain water, condensation and the like is guided by the outer surface of the skirt 14 and towards a receiving surface that can guide the water by gravity to a desired location.

In FIG. 6 the water skirt wall 14 guides the water into a receiving channel 19 formed/defined by walls of a flashing part 20 that is attached to the fixation frame 7, and these walls encloses the receiving channel 19. The receiving channel 19 hence guides the water downwards by gravity. Alternatively, the channel 19 may be omitted and the water may be guided onto a flashing surface of a flashing 20 not defining an enclosing channel with side walls (see FIG. 7), or directly onto a roof material. The flashing 20 may be a plate such as a plastic or metal plate or sheet, or it may be a fabric material made substantially impermeable to water.

In FIG. 7, the fixation wall 13a of the sash profile 13 is arranged opposite the exterior surface S2 of the VIG unit 3, and the bonding seal 15 is hence placed between the fixation wall 13a and the exterior surface S1. The sash profile hence comprises the fixation wall 13a, the protection wall 13b and the water skirt wall 14.

FIG. 7 illustrates a further embodiment of the present disclosure wherein a part of the sash profile 13 comprises a double wall construction (in other embodiments it may be a single walled construction), and in the example of FIG. 7, the double wall construction is the part of the sash profile comprising the protection wall. Here a further wall 13c is placed parallel to the protection wall 13b, and this may e.g. help to provide enhanced stiffness properties and/or heat insulation of the sash profile 13. The space between the walls 13b, 13c may be filled with air or in further embodiments an insulation material. Other parts of the sash profile 13, such as the water skirt 14 and/or the fixation wall 13a may additionally or alternatively comprise a double (or more) walled construction (not illustrated), or it may be a single walled construction. The double (or more) walled construction may either provide a space between the parallel walls, or the walls may abut, this may e.g. be the case of the sash profile 13 is roll formed and thus comprises walls that are shaped to abut.

It is generally understood that a resilient gasket, such as a rubber gasket a foam gasket and/or an elastomer gasket or the like (not illustrated) may in further embodiments be placed between the wall 13a and the VIG unit in order to ensure sufficient water tightness. This gasket may be attached to the wall 13a or additionally or alternatively to the VIG unit surface S2 (or S1 dependent on the solution, see the figures described above or below) bonded to the bonding seal.

FIG. 8 illustrates an embodiment of the present disclosure wherein the sash profile 13 does not comprise a protection wall. Hence, the edge surface 16 of the VIG unit 3 is exposed and uncovered by the sash profile.

FIG. 8 moreover illustrates an embodiment of the present disclosure, wherein a minor part 22 of the VIG unit 3 extends beyond the outermost part of the outer surface 9a of the fixation frame 7 with a distance DIS2, and hence the VIG unit comprises a part 21 that overlaps the fixation frame member 8a with a distance DIS3 corresponding to the width of the frame member 8a. The bonding material 15 bonds to a part of the surface S2 of the part 22 of the VIG unit 3 that extends beyond the surface 9a, as well as to a part 21 of the surface S2 that overlaps and covers the overlapped surface 11 of the fixation frame 7 that faces the interior surface S2. The fixation wall 13a hence extends from the part 22 of the surface S2 that extends beyond the outer surface 9a of the fixation frame 7, and in between the surface 11 of the overlapped member 8a of the fixation frame 7 and the interior major surface SS of the VIG unit 3. The bonding material 15 may as also illustrated in FIG. 8 be terminated at the outer major surface S2 so that the edge surface 16 of the vacuum insulated glass unit 7 is unbonded to the bonding seal material 15.

FIGS. 9a-9b illustrates an embodiment of the present disclosure wherein the sash 6 is fixed to the VIG unit at a part 22 of the VIG unit that extends beyond the fixation frame. Here, the VIG unit comprises a part 21 that overlaps the fixation frame so that the VIG unit comprises a further part 22 that extends beyond the outermost surface 9a of the fixation frame 7. The bonding seal material 15 is fixed to the VIG unit 3 surface S2 at the part 22 that extends beyond the fixation frame 7. The sash profile 13 is here fixed to an elongated sash member 23, by that the fixation wall 13a is fixed to the member 23. This elongated sash member 23 overlaps the outer surface 9a of the fixation frame, and may serve as a water protection solution in the form of a water skirt wall 14 an/or a strengthening member. The displacement mechanism 80 such as one or more hinged connections (not illustrated in FIGS. 9a-9b, see FIGS. 3-4) may in further embodiments of the present disclosure be attached to the elongated sash member 23 rather than being connected to the sash profile 13 that is connected to the VIG unit. The elongated sash member 23 may be made from wood e.g. a softer or harder wood material (see previous description of wood material in relation to the description of FIG. 4), and/or it may comprise a metal material or be a metal material profile, where the metal is for example aluminium or steel. Also or alternatively, the sash member 23 may be made from or comprise a polymer material such as plastic, a PUR or PVC material or a carbon fibre or glass fibre containing material. The member 23 may be solid as illustrated or may be hollow and comprise insulating cavities, and may in further embodiments be an extruded or pultruded member, or alternatively manufactured by roller forming/shaping. It is also understood that the sash member 23 may in further embodiments of the present disclosure be an integrated part of the elongated sash profile(s) 13.

The fixation of the member 23 to the the sash profile 13 may be provided by an adhesive and/or mechanical fasteners (not illustrated) such as one or more of nails, screws, pop rivets, a snap connection, positive engagement like a tongue and groove configuration and/or the like.

The distance DIS3 with which the part 21 of the VIG unit 3 overlaps the fixation frame 7 is defined by the width W1 of the fixation frame, as the VIG unit also extends beyond the surface 9a in FIGS. 9a-9b.

This distance DIS3 (and hence also the width) may generally in embodiments of the present disclosure be between 2.5 cm and 12 cm such as between 3 cm and 10 cm, for example between 4 cm and 8 cm.

The distance DIS2 with which the part 22 of the VIG unit extends beyond the outer surface 9a of the frame may generally in embodiments of the present disclosure be between 1 cm and 10 cm such as between 1 cm and 8 cm, for example between 1 cm and 6 cm or between 2 cm and 7 cm or between 2 cm and 6 cm.

The distances DIS2, DIS3 and the width W1 are determined in a direction perpendicular to the longitudinal direction LD of the edge surface 16 of the VIG unit 3.

The summarized distance DIS2+DIS3 from the outer edge surface 16 and to the location where the VIG unit starts to overlap the member 8 may in embodiments of the present disclosure be at least 25 mm, such as at least 35 mm, such as at least 50 mm. The summarized distance DIS2+DIS3 may be at or below 150 mm, such as below 100 mm, for example below 70 mm.

In one or more embodiments of the present disclosure, the ratio between the summarized distance DIS2+DIS3 and the length LEL of the longest edge of the vacuum insulated glass unit 3 (see edges 50a and 50b in figures illustrating edge deflection) is at least $$\frac{DIS2 + DIS3}{LEL} = \frac{25}{LEL}$$

such as at least $$\frac{35}{LEL},$$

for example at least $$\frac{50}{LEL}.$$

for example, the ratio may, if the length LEL of the longest edge(s) is 1400 mm and the summarized distance DIS2+DIS3 is 60 mm, be (DIS2+DIS3)/LEL=60/1400=0.043. The ratio between the distance DIS2+DIS3 and the longest edge length LEL may preferably be within 0.015 and 0.07, such as between 0.017 and 0.06, for example between 0.018 and 0.05.

In FIGS. 9a-9b, FIG. 8 and FIGS. 6 and 7, the VIG unit 3 overlaps (21) the fixation frame 7 with a distance DIS3 that substantially corresponds to the width W1 of the frame member 8.

In other embodiments of the present disclosure, the VIG unit may overlap the member 8 with a distance DIS3 that is less than the width W1 of the member 8a, and the edge surface 16 is hence placed above the surface 11, see e.g. FIGS. 5a-5b.

As illustrated in e.g. FIGS. 6 and 7, the overlapping distance DIS3 may correspond substantially to the width W1, and hence, the edge surface 16 may be placed substantially above the outer surface 9a of the fixation frame 7.

The gasket 10 may generally help to provide an air tightening at the interior surface S2 of the VIG unit 1.

FIG. 9a-9b illustrates a further embodiment of the present disclosure wherein the gasket 10 comprises elongated flaps/lips 10a, 10b such as rubber or elastomer lips. in FIG. 9a, the flaps/lips 10a, 10b are each deflected/compressed by the VIG unit surface S2 when compared to a free un-deflected state, and ae in contact with/abuts the VIG unit surface S2. These tightening flaps/lips 10a, 10b help to protect against condensation at the VIG unit edge area due to a cold bridge provided between VIG unit glass sheets 3a, 3b by the edge sealing 11.

A space 10c defined between the flaps/lips 60a, 60b and enclosed by the VIG unit surface S2 helps to provide an air and/or heat insulation. In FIGS. 9a and 9b, two flaps/lips 10a, 10b are provided. Just one flap/lip may also be provided in further embodiments, or more than two may be provided.

Additionally, it is understood that the flaps/lips 10a, 10b may as illustrated be part of the same gasket arrangement, but they may also alternatively be part of separate individual elongated gasket arrangements.

The gasket lips 10a, 10b follow the VIG unit according to a thermal deflection of the VIG unit in the region at/near the gasket lips when the VIG unit's thermal deflection changes due to a temperature difference variation, due to the resilient properties of the gasket arrangement 10, so as to provide an air tightening functionality.

As can be seen in FIG. 9a, the gasket 10 lips 10a, 10b are deflected by the VIG surface S2 due to the sash being in the closed position, and hence provides the gasket height Hcs. In FIG. 19b, the gasket 10 is in an un-deflected height Hu that is larger than height Hcs due to that the sash 6 has been opened. Hence the gasket lips 10a, 10b have moved to an un-deflected state.

FIG. 10 illustrates a cross sectional view through an aperture cover 1 such as a window according to embodiments of the present disclosure. Here the difference between the total width TWsa of the sash 6, and the total width TWfr of the fixation frame 7 is approximately 0.

Generally, in embodiments of the present disclosure, the difference between the total width TWsa of the sash 6, and the total width TWfr of the fixation frame 7 may be less than ±15%, such as less than ±8%, for example less than ±5% of the total width of the fixation frame 7. In certain embodiments of the present disclosure, the difference between the total width TWsa of the sash 6, and the total width TWfr of the fixation frame 7 is less than or equal to ±2% or less than or equal to ±1% or even less than or equal to ±0.5% of the total width of the fixation frame 7.

The same may additionally or alternatively apply for the total height of the frame 7 and the total height of the sash 6 respectively.

Generally, the difference between the total width TWvig of the VIG unit 3, and the total width TWfr of the fixation frame 7 may in embodiments of the present disclosure be less than ±8%, such as less than ±5% of the total width of the VIG unit.

The same may apply for the total height of the frame 7 and the total height of the VIG unit 3 respectively. In certain embodiments of the present disclosure, the difference between the total width TWvig of the VIG unit, and the total width TWfr of the fixation frame 7 is less than ±2% or less than ±1% of the total width of the VIG unit.

For example, if the total width TWvig of the VIG unit is 120 cm, the frame 7 may, with a ±1% max width difference comprise a total width TWfr between approx. 119 and 121 cm.

The difference between total height and/or total width of the VIG unit and total height and/or width of the fixation frame 7 may in embodiments of the present disclosure be between 0 and 5 cm such as between 0 and 3 cm, for example between 0 and 1 cm or between 0 and 0.5 cm.

The difference between total height (THvig) and/or total width (TWvig) of the VIG unit and total height and/or width (TWfr) of the fixation frame 7 may in embodiments of the present disclosure be between 0 and 5 cm such as between 0 and 3 cm, for example between 0 and 1 cm or between 0 and 0.5 cm.

In embodiments of the present disclosure, the difference between the total area described by the total width and total height of the fixation frame 7 and the sash 6 respectively, may be less than ±8%, such as less than ±5% of the total area described by the fixation frame 7. In certain embodiments of the present disclosure, the difference between the total area described by the total width and total height of the fixation frame 7 and the total area described by the total width and total height of the sash 6, respectively, may be less than ±2% or less than ±1% of the total area described by the fixation frame 7.

For example a 1 m×1.2 m fixation frame (width×height) provides a 1.2 m² total fixation frame area. This provides a total area of the sash 12 (with a ±2% total area tolerance), of approximately 1.18 m² to 1.22 m².

The total area (length times height) of the fixation frame 7 and the total area (length times height) of the VIG unit 3 and/or of the sash 6 may in further embodiments of the present disclosure be substantially the same.

FIG. 10 moreover illustrates a further embodiment of the present disclosure, wherein the VIG unit 3 is a laminated VIG unit 3. The VIG unit accordingly comprises a lamination glass sheet 70. The lamination glass sheet 70 may be a tempered, e.g. thermally tempered, glass sheet, or alternatively, it may be an annealed glass sheet, or generally a float glass sheet. This lamination glass sheet 70 is attached/bonded (by means of a lamination interlayer 71) to the outer surface of the VIG unit glass sheet 3b facing towards the interior and thus, away from the exterior surface S1 and the evacuated gap 4. Hence, the lamination glass sheet 70 provides the interior surface S1 of the VIG unit 3. The lamination interlayer 71 may be a PVB or EVA lamination material. The fixation wall 13b of the sash may be connected to the VIG unit 3 by connecting it to the interior surface S2 of the lamination glass sheet, and/or by connecting it to the exterior surface S1, by a bonding seal 9. In the example of FIG. 15, the gasket 10 abuts the lamination glass sheet 70 as the lamination glass sheet 70 faces the interior and provides the interior surface S2. It is generally understood that a laminated VIG unit may be used in any of the embodiments described above and/or below.

FIG. 11 illustrates an embodiment of the present disclosure wherein the sash provides a clamping fixation system which fixates the VIG unit 3 to the sash 6. Here, two fixation walls 13a of the sash profile 13 provides a space 24 between the walls 13a into which the VIG unit edge extends. The bonding seal 15 is placed between the walls 13a and the major surfaces S1, S2 of the VIG unit respectively. Accordingly, at least if the VIG unit edge thermally deflects, the walls 13a provides a counter force to the bonding seal so that a certain amount of constriction of the VIG edge is provided by the profile 13 between the fixation walls. In FIG. 11, the profile provides a cross sectional C-shape by means of the walls 13a and the protection wall 13b. The profile 13 illustrated in FIG. 11 may in further embodiments of the present disclosure comprise a water skirt 14 (not illustrated in FIG. 11, see previously described FIGS. 6 and 7).

FIGS. 12 and 13 illustrates schematically a VIG unit's 3 thermal deflection of the VIG unit's edge as a result of a temperature difference $\Delta T=T1-T2$ between the two VIG unit glass sheets 3a, 3b providing the evacuated gap 4, according to embodiments of the present disclosure.

In FIG. 12, the VIG unit 3 is shown schematically and in perspective, where it can be seen that the outer major surface S1 of the VIG unit 3 obtains a convex shape when a first temperature T1 (See FIG. 13) is higher than temperature T2 at the other side of the VIG unit, side whereas the outer surface S2 of the other (lower) glass sheet 3b (not visible in FIG. 10) provides a concave shape due to the thermal deflection and the evacuated gap, and hence the glass sheets of the VIG unit deflects in the same direction.

The VIG unit 1 deflects relative to the VIG unit plane P1 (determined where $\Delta T$ is substantially zero) and relative to the frame opening (not illustrated in FIGS. 12-13), in the directions D1, D2 which are perpendicular to the plane P1. The plane P1 extends in the x-y direction/plane. As can be seen the VIG unit edges 50a-50d provides a deflection curve (DC—See FIG. 13) causing the VIG unit edge centre 52 to move in the directions D1, D2 which are in the z direction, relative to the plane P1. This deflection curve DC is described between the corners 51 where the respective edge 50a-50d terminates.

The VIG unit 3 is rectangular and comprises longer, parallel edges 50a, 50b, and shorter end edges 50c, 50d.

FIG. 13 illustrates schematically and seen from the side onto the long edge 50b, the thermal deflection of the edge 50b. As can be seen, the VIG unit edge 50b tends to describe a deflection curve DC due to thermal deflection of edge 50b, caused by a temperature difference $\Delta T=T1-T2$ between the two glass sheets 3a, 3b. In the present example, the glass sheet 3a is subjected to a higher temperature T1 than the glass sheet 3b which is subjected to temperature T2. This causes the glass sheet 3a to expand more than glass sheet 3b. As the edge seal 11 of the VIG unit 3 may provide a very rigid connection between the glass sheets, this causes the VIG unit 3 to thermally deflect, so that the edges of the glass sheets 3a, 3b moves in the same direction, and this temperature difference causes the edge 50b to describe a deflection curve DC that varies relative to the plane P1.

The outer, major surface S1 of the VIG unit 3 at and near the edge 50b, e.g. at the surface S1 opposite to the edge seal 3 thus obtains a convex shape when T1 is higher than T2 whereas the outer surface S2 of the other (lower) glass sheet 3b provides a concave shape.

As can be seen, the corners 51 of the VIG unit where the edge 8b terminates move in a direction D2 relative to the plane P1, whereas the centre portion 52 of the edge 50b, moves in the opposite direction D1 than the direction D2, relative to the plane P1. This is the case when the VIG unit is not fixed in a frame and is allowed to freely bend in space in the z-direction.

When/if the glass sheet 3b gets hotter than glass sheet 3a, caused by a temperature change of T1 and/or T2, the corners 51 of the VIG unit moves in the other direction D1 relative to the plane P1 and/or P2, and the centre portion 52 of the edge 50b, move in the direction D2, relative to the plane P1.

In one or more other embodiments of the present disclosure, the largest total edge deflection DIS4 of any of the edges 50a-50d of the vacuum insulated glass unit 3 at a temperature difference ΔT=T1−T2 between the two glass sheets 3a, 3b of 65° C. as compared to the VIG unit at a temperature difference ΔT=T1−T2 of 0° C. is at least 2 mm, such as at least 3 mm or at least 4 mm, such as in the range of 2 mm to 30 mm, preferably in the range of 3 mm to 20 mm. This is in an un-constricted state where the VIG unit is allowed to freely bend. These numbers with regarding to DIS4 may also apply for a laminated VIG unit in embodiments of the present disclosure. The numbers with regard to DIS4 may apply for a VIG unit having a surface area of the surfaces of above 0.9 m², such as at least 1.1 m², such as above 1.5 m². Here, it may be preferred that at least the longer edges 50a, 50b may be above 1 m in length.

In some embodiments, the total edge deflection DIS4 will be the sum of the largest distances of positions of the VIG unit edge in question from the plane P1 in each their direction D1, D2 from that plane. In FIG. 13, the largest total edge deflection DIS4 is defined between the deflection of the edge seal 11 at the centre 52 of the edge 50b, and the edge seal 11 at the corner 51 of the same edge, in a direction perpendicular to the plane P1.

In one or more embodiments of the present disclosure, when the VIG unit is arranged in the frame, the largest total edge deflection DIS4 of any of the edges 50a-50d of the vacuum insulated glass unit 3 at a temperature difference ΔT=T1−T2 between the two glass sheets 3a, 3b of 65° C. as compared to the vacuum insulated glass unit at a temperature difference ΔT of 0° C. may be at least 0.3% of the length of the deflecting edge 50a-50d, such as in the range of 0.3% to 3.5% of the length of the deflecting edge, such as in the range of 0.4% to 2% of the length of the deflecting edge, such as in the range of 0.6% to 1.5% of the length of the deflecting edge. In one or more further or alternative embodiments of the present disclosure, the largest total edge deflection DIS4 of any of the edges 50a-50d of the vacuum insulated glass unit at a temperature difference between the two glass sheets of 40° C. as compared to the vacuum insulated glass unit at a temperature difference of 0° C. may be at least 0.15% of the length of the deflecting edge, such as in the range of 0.15% to 3% of the length of the deflecting edge, such as in the range of 0.25% to 1.8% of the length of the deflecting edge, such as in the range of 0.35% to 1.2% of the length of the deflecting edge.

FIG. 14 illustrates an example of a situation where a VIG unit 3 is subjected to a varying temperature difference ΔT=T1−T2 between the glass sheets 3a, 3b over time, according to embodiments of the present disclosure. For example, it is common for e.g. building aperture covers such as windows or doors arranged in openings of outer walls, roofs or the like of a building, that these are subjected to varying temperature differences over time after they have been installed. For example, with a general room temperature T1 of e.g. about 20° C. in the building, the temperature T2 at the other side (outside a building) of the VIG unit 3 may vary significantly, such as between e.g. 15° C. and 30° C. or even more, over 24 hours. Even, the temperature difference ΔT=T1−T2 may so to say switch "operational sign" so that the hotter side of the VIG unit 3 may shift one or more times over e.g. 24 hours, many times over a calendar year, or even in the case that a hail, rain or snow shower occurs for a short period of time. This may largely depend on the geographical area where the VIG unit frame assembly is installed, and causes the rate and even direction of the thermal deflection to change over time.

As an example over 24 hours, the outside temperature T2 may start to be 10° C. at 8 PM, and at 3 AM it may be 35° C., and it then gradually decreases again to 10° C. overnight. The inside temperature T1 is set to e.g. be 20° C. the whole 24 hours. This causes the temperature difference ΔT to switch operational sign: The temperature T1 is 20° C. at the inside, and T2 (outside) is 10° C. at 8 PM. Thus, the VIG unit edge 50b corners 51 deflect in the direction D2 as illustrated in FIG. 13. Then the thermal deflection of the VIG unit edge 50b gradually changes (illustrated by dashed, envisaged deflection curves/arc DC) as the temperature T2 changes to be 35° C. at 3 AM at surface 4b, and thus 15° C. higher than T1. Thus, the VIG unit thermal deflection changes so that the edges 5a0-50d deflects in the other direction, and then, it deflects back again as the temperature T2 changes back to the about 10° C. overnight. This may even vary over the year dependent on the time of year, and e.g. in winter time, the outside temperature may be significantly below 0° C., and in the summer time, it may be significantly above 30° C., although the inside room temperature may be desired to be substantially constant, e.g. by help from a room heating system or cooling system (e.g. air-conditioning). These systems may also be known as HVAC (Heating, ventilation, and/or air conditioning). Even more extreme temperature conditions may appear in cases where the VIG unit is installed in a roof window.

Accordingly, the thermal deflection of the VIG unit 3 may vary significantly over 24 hours and even more over a longer period such as a calendar year and may depend on different weather conditions. This causes varying stress condition on the VIG unit over time, such as at the edges 50a-50d near the location where the VIG unit glass sheets are connected to seal the evacuated gap by e.g. an edge sealing 11. The stress conditions are complex. Examples of these stresses may be shear stresses at the VIG edge, differential stresses where tensile stress occurs at the deflecting glasses and/or stress concentrations at the corners.

The same may apply for doors of freezers and cooling furniture, e.g. when the cooling furniture is switched on or off, or due to opening and closing a door with a VIG unit therein.

The frame 2 may in embodiments of the present disclosure comprise a restriction arrangement for restricting the thermal deflection of the edge(s) 8a-8d, such as for example the longest edges 50a, 50b of the VIG unit or all edges of the VIG unit. This restriction arrangement may comprise a gasket solution, one or more stop parts or walls of the frame preventing an edge deflection above a certain point and/or the like, or a clamping solution as described in relation to FIG. 11. Additionally, it is understood that a bonding seal 15 at one side of the VIG unit may provide a sufficient restriction of the thermal edge deflection in embodiments of the present disclosure.

In some embodiments of the present disclosure, the sash profile 13 as previously described and/or the bonding seal 9 may be configured to allow the edges of the VIG unit 3 to thermally deflect in response to a temperature difference ΔT=T1−T2 between the glass sheets (3a, 3b) of the vacuum insulated glass unit as explained above. For example, in one or more embodiments the largest edge deflection DIS4 (see FIG. 12) in a deflection direction of any of the edges of the vacuum insulated glass unit at a temperature difference between the two glass sheets of 65° C., as compared to the vacuum insulated glass unit at a temperature difference (ΔT) of 0° C. may be at least 1 mm, such as in the range of 2 mm to 50 mm, preferably in the range of 1, 2 or 3 mm to 15 mm, more preferred in the range of 2 to 10 mm. This may be provided by that one or more walls 13a, 13b of the profile 13 may be forced to deflect by the VIG unit edges due to the thermal deflection of the VIG unit edge. Also or alternatively, the bonding seal 15 may be compressed and/or stretched (dependent on the position along the edge) in response to a thermal deflection of the vacuum insulated glass unit caused by a temperature difference (ΔT) between the glass sheets 3a, 3b of the vacuum insulated glass unit. This changes the thickness of the bonding seal 15 at one or more locations along the member 13a when compared to the thickness at the same one or more locations when the temperature difference ΔT is substantially 0° C.

The sash 6 may though be configured to partly restrict a thermal deflection of the vacuum insulated glass unit 3 at the edges 50a-50d in response to a temperature difference ΔT between the glass sheets 3a, 3b of the vacuum insulated glass unit, when compared to a free, unrestricted thermal deflection of the vacuum insulated glass unit at substantially the same temperature difference ΔT. For example, in one or more aspects of the present disclosure, the largest total edge deflection of the edges 50a-50d of the VIG unit 3 may be configured to be at least 10% smaller, such as at least 20% smaller, such as at least 30% smaller than the largest total edge deflection of the unrestricted vacuum insulated glass (VIG) unit at a temperature difference (ΔT=T1−T2) of at least 40° C., such as about 65° C. This restriction may be provided by the bonding seal 15 and/or the profile 13, for example, in further embodiments, in combination with the gasket 10 and/or one or more protrusions (not illustrated in any figure of the present disclosure) located along the length of the fixation frame member 8a (see e.g. FIGS. 5a-11). These may together provide a clamping force onto the VIG unit, at least when the edge deflection exceeds a certain level, so that the more edge deflection, the more constriction of the thermal edge deflection of the VIG unit edges.

FIG. 15 illustrates a visualized computer simulation of a "free" thermal deflection of a VIG unit 3 used for a frame 2 according to embodiments of the present disclosure, which has been provided by one of the present inventors. The VIG unit 3 simulated was based on a VIG unit model defined to have the following characteristics:

The VIG unit is laminated and hence comprises a lamination glass and a lamination interlayer
Length L1 of shorter edges 50c 50d: 114 cm
Length of the longer edges 50a, 50b: 140 cm
Glass sheets 3a, 3b Thermally tempered glass sheets each having a thickness of 4 mm.
Lamination glass: annealed float glass of a thickness of 4 mm
Edge seal 11 material: solder glass edge seal material
The VIG is arranged with the surfaces S1, S2 horizontally (when the temperature difference ΔT=T1−T2 is 0° C.) and is thus simulated so that gravity acts on the VIG unit.
Temperature difference between T1 and T2: about 60° C.
The hotter side (S2) was set to be the lamination glass side and hence the lamination glass sheet provides the outer major surface S2 in FIG. 15.

For the computer simulation model, a temperature difference/gradient profile was established in accordance with temperatures measured across the hotter/heated side. This profile was based on temperature measurements provided during the test described below. This profile was used in the simulation model for the hotter side. The lamination interlayer was a PVB material.

Under these conditions, the simulation results defined that the distance DIS4 from the centre part 52 of the longer edge 50b would be 7.82 mm from the plane P1 (DIS4).

Moreover, under these conditions, the simulation results defined that the distance DIS4 from the centre part 52 of the shorter edge 50c would be 5.15 mm from the plane P1.

FIGS. 16 and 17 are images of a test of a thermal deflection of a laminated VIG unit 3 having substantially the parameters as defined above with regard to FIG. 14. The VIG unit 3 was placed horizontally to support on support surfaces 61a of a plurality of support rods 61 of a support frame 60. The VIG unit 3 supported initially, when the temperature difference ΔT=T1−T2 was substantially 0° C., on substantially all support surfaces of the frame 62 on which the VIG unit was arranged.

An infrared heat radiation arrangement 63 was arranged above the upper glass sheet, i.e. the lamination glass sheet, and covered the upper glass sheet to a bit beyond the side surfaces 7 of the VIG unit 3. Then the heating arrangement 63 started to heat the upper glass sheet 70 of the VIG unit 3, so that the upper glass sheet reached a maximum temperature of approx. 100° C., and the lower glass was measured to have a temperature of approximately 35° C. It was expected and validated that the temperature of the heated glass facing the radiation heater varied over the surface due to cold bridges caused by among others the edge seal of the VIG unit. Hence, no completely uniform heating was obtained (as opposed to the simulation results), but the maximum temperature measured at the heated glass sheet was about 100° C., and for the majority of the heated surface, the temperature was determined to be above at least 85° C. and at many locations above 90° C.

The present inventors could after the heating by the infrared heating arrangement visually see and confirm a formation of an edge deflection curve DC between the VIG unit corners 51. This provided a maximum edge deflection DIS4 of the VIG unit due to the forced temperature difference ΔT=T1−T2, when compared to the temperature difference ΔT=T1−T2 of substantially 0° C. The distance DIS4 was determined by a first reference point defined by a support surface 61a (that was used as a reference for the plane P1), and the lower surface of the VIG unit 3, in a direction substantially perpendicular to the plane P1.

The maximum edge deflection DIS4 of the long edge 50b (FIG. 16) was measured to be approximately 7.4, or more precisely 7.43 mm at the forced temperature difference, when compared to the temperature difference ΔT=T1−T2 of substantially 0° C.

FIG. 17 illustrates the edge deflection of the shorter edge 50c of the same VIG unit as tested in FIG. 16. Here, in a similar way, the shorter edge 50c described an edge deflection curve DC due to the forced heating and the temperature difference between T1 and T2. Additionally, the maximum edge deflection DIS4 of the edge 5b was measured to be approximately 5.3, or more precisely 5.33 mm, at the forced temperature difference, when compared to the temperature difference ΔT=T1−T2 of substantially 0° C.

Accordingly the maximum tested edge deflection DIS4 vs the simulated edge deflection resulted in the values of table 1 below.

TABLE 1

|  | Simulated edge deflection DIS4 | Edge deflection test (FIGS. 15-16) DIS4 |
| --- | --- | --- |
| Longer edge 50b | 7.82 mm | 7.43 mm |
| Shorter edge 50c | 5.15 mm | 5.33 mm |

The inventors concluded that the test illustrated in FIGS. 16-17 validated the computer simulations, and thus confirmed that the VIG unit computer simulations was sufficiently precise and reliable.

Additionally, the test approved that the edges of larger size laminated VIG units having rigid edge seals 11 provided by fused edge seal material such as solder glass or a metal solder, when subjected to a larger temperature difference, will tend to provide/describe an edge deflection curve/arc DC that causes a substantial edge deflection DIS4 in an un-constricted situation where no "outer" mechanical forces constrains the edge deflection. This also applies in laminated VG units and in VIG units without a laminated sheet.

The above disclosure is generally described as relating to a building aperture cover in the form of architectural aperture coverings, more particular in the form of window solutions. It is generally understood that these window solutions may e.g. be for vertical windows where the VIG unit is arranged with a plane P1 arranged with an angle of substantially 90° compared to horizontal. In further aspects of the present disclosure, the window is a roof window where the VIG unit 3 is arranged with an angle different from vertical, for example where the plane P1 is arranged with an angle between 5° and 90°, such as between 10° and 75° or 5° and 85°, compared to horizontal, or substantially completely horizontally. It is however understood that the solutions disclosed above may also be used in architectural aperture coverings in the form of doors comprising windows.

In further embodiments of the present disclosure, the VIG unit frame 2 solutions disclosed in this document may be used as architectural aperture coverings in or as curtain walls.

In still further embodiments of the present disclosure, the VIG unit frame 2 solutions disclosed in this document may be aperture coverings in the form of gates/doors and/or walls of cooling appliances such as freezers or refrigerators, for example of refrigerators for storing food for human consumption at a temperature below 7° C. such as below 5° C., e.g. below 0° C., or below −10° C., such as between −5° C. and −30° C. Here the content such as goods placed inside the cooling appliances will be visible from the exterior of the cooling appliances by looking through the VIG unit 3.

While the present disclosure has been described in detail in connection with only a limited number of embodiments or aspects, it should be readily understood that the present disclosure is not limited to such disclosed embodiments or aspects. Rather, the present disclosure can be modified to incorporate any number of variations, alterations, substitutions or equivalent arrangements not heretofore described, but which are commensurate in scope with the present disclosure. Additionally, while various embodiments or aspects of the present disclosure have been described, it is to be understood that aspects of the present disclosure may include only some of the described embodiments or aspects or combinations of the various embodiments or aspects. Accordingly, the present disclosure is not to be seen as limited by the foregoing description.

The invention claimed is:

1. An aperture cover, wherein the aperture cover comprises:
   a vacuum insulated glass unit comprising a first glass sheet and a second glass sheet, wherein an evacuated gap is placed between the first and second glass sheets, wherein a plurality of support structures are distributed in the evacuated gap, wherein an edge seal encloses the evacuated gap, wherein the edge seal comprises a rigid, fused edge seal, wherein the vacuum insulated glass unit comprises outer major surfaces, and
   a frame, wherein the frame comprises a fixation frame and a sash which is fixed to the vacuum insulated glass unit, and wherein the sash is movably connected to the fixation frame by means of a hinge connection,
   wherein the fixation frame comprises elongated frame members defining a frame opening, wherein the vacuum insulated unit is configured to overlap a surface of at least one elongated frame member of the fixation frame, at least when the sash is in a closed position, and
   wherein the sash comprises a sash profile which is fixed to the vacuum insulated glass unit at a part of the vacuum insulated glass unit that overlaps and/or extends beyond the overlapped elongated frame member,
   wherein a resilient sealing gasket is arranged between the overlapped elongated frame member and the vacuum insulated glass unit, wherein the resilient sealing gasket is configured to abut an interior major surface of the vacuum insulated glass unit when the sash is in a closed position, and wherein the interior major surface of the vacuum insulated glass unit is configured to compress the resilient sealing gasket when moving the sash from an open to a closed position,
   wherein the sash profile is elongated and attached to the interior major surface of the vacuum insulated glass unit by means of a bonding seal;
   wherein a resilient sealing is placed between a protection wall and an edge surface of the vacuum insulated glass unit.

2. An aperture cover according to claim 1, wherein the sealing gasket is configured to be compressed by at least 2 mm by the interior major surface of the vacuum insulated glass unit when compared to a sealing gasket height in an uncompressed condition, when a temperature difference between the glass sheets of the vacuum insulated glass unit is substantially 0° C.

3. An aperture cover according to claim 1, wherein a height of the resilient sealing gasket is configured to be at least 5 mm in an uncompressed/un-deflected condition.

4. An aperture cover according to claim 3, wherein the height of the resilient sealing gasket is at least 8 mm or at least 10 mm in an uncompressed condition.

5. An aperture cover according to claim 1, wherein a magnitude of a compression of the sealing gasket by the vacuum insulated glass unit is configured to vary across a length of the sealing gasket when a temperature difference between the two glass sheets of the vacuum insulated glass unit enclosing the evacuated gap is 65° C.

6. An aperture cover according to claim 1, wherein the sealing gasket is placed with a distance of at least 25 mm from an edge of the vacuum insulated glass unit when the sash is in a closed position.

7. An aperture cover according to claim 1, wherein the sash profile is a as-metal profile, wherein the bonding seal comprises a structural adhesive, wherein said bonding seal has a thickness between 4 mm and 13 mm at a temperature difference between the two glass sheets of the vacuum insulated glass unit of substantially 0° C.

8. An aperture cover according to claim 1, wherein the exterior major surface of the vacuum insulated glass unit is substantially uncovered by the sash.

9. An aperture cover according to claim 1, wherein the aperture cover is a roof window.

10. An aperture cover according to claim 1, wherein the elongated frame members of the fixation frame comprises a top profile member, a bottom profile member and two parallel side profile members, and wherein the overlapped elongated frame member is at least the two parallel side profile members and/or the bottom profile member.

11. An aperture cover according to claim 1, wherein an edge of the vacuum insulated glass unit extending parallel to and along the overlapped elongated frame member is allowed to deflect in response to a temperature difference between the two glass sheets of the vacuum insulated glass unit.

12. An aperture cover according to claim 11, wherein one or more of the edges of the vacuum insulated glass unit is/are allowed to provide a deflection curve/arc between corners where the respective edge terminates in response to a temperature difference between the two glass sheets of the vacuum insulated glass unit.

13. An aperture cover according to claim 1, wherein the sash profile is fixed to the vacuum insulated glass unit at a part of the vacuum insulated glass unit that overlaps the overlapped elongated frame member.

14. An aperture cover according to claim 1, wherein the vacuum insulated glass unit overlaps the fixation frame by a distance, wherein said distance is at least 2.5 cm.

15. An aperture cover according to claim 1, wherein a part of the vacuum insulated glass unit extends beyond an outer surface of the fixation frame with a distance of at least 1 cm.

16. An aperture cover according to claim 1, wherein the sash profile is fixed to the vacuum insulated glass unit at a part of the vacuum insulated glass unit that extends beyond an outermost surface of the fixation frame.

17. An aperture cover according to claim 1, wherein the vacuum insulated glass unit is a laminated vacuum insulated glass unit comprising a lamination interlayer bonding a lamination glass sheet to a major surface of the vacuum insulated glass unit, wherein the lamination glass sheet is arranged at a side facing the overlapped elongated frame member, wherein the lamination glass sheet comprises the interior major surface of the vacuum insulated glass unit which the resilient sealing gasket is configured to abut when the sash is in a closed position.

18. An aperture cover according to claim 1, wherein a minimum distance between an outer major surface of the vacuum insulated glass unit and walls of said frame is at least 4 mm at a temperature difference between the two glass sheets of the vacuum insulated glass unit of substantially 0° C.

19. An aperture cover according to claim 1, wherein the a largest total edge deflection in a deflection direction of any of the edges of the vacuum insulated glass unit at a temperature difference between the two glass sheets of 65° C. as compared to the vacuum insulated glass unit at a temperature difference of 0° C. is at least 0.3% of a length of the deflecting edge.

* * * * *